United States Patent
Fujita et al.

(10) Patent No.: US 9,718,004 B2
(45) Date of Patent: Aug. 1, 2017

(54) FILTER MEDIUM LAYER AND FILTER DEVICE PROVIDED WITH SAME

(71) Applicant: ISHIGAKI COMPANY LIMITED, Tokyo (JP)

(72) Inventors: Kunio Fujita, Kagawa (JP); Hidetaka Ujike, Kagawa (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 235 days.

(21) Appl. No.: 14/348,973

(22) PCT Filed: Sep. 21, 2012

(86) PCT No.: PCT/JP2012/074253
§ 371 (c)(1),
(2) Date: Apr. 1, 2014

(87) PCT Pub. No.: WO2013/051405
PCT Pub. Date: Apr. 11, 2013

(65) Prior Publication Data
US 2014/0291224 A1   Oct. 2, 2014

(30) Foreign Application Priority Data

Oct. 3, 2011  (JP) ................................. 2011-219139
Mar. 16, 2012  (JP) ................................. 2012-059681
Mar. 29, 2012  (JP) ................................. 2012-076355

(51) Int. Cl.
*B01D 24/02* (2006.01)
*B01D 24/10* (2006.01)
(Continued)

(52) U.S. Cl.
CPC ............. *B01D 24/10* (2013.01); *B01D 24/02* (2013.01); *B01D 24/12* (2013.01); *B01D 24/165* (2013.01);
(Continued)

(58) Field of Classification Search
CPC ...... B01D 24/12; B01D 24/165; B01D 24/10; B01D 39/1676; B01D 24/02; B01D 39/083; B01D 39/02; B01D 39/04; B01D 39/06
(Continued)

(56) References Cited

U.S. PATENT DOCUMENTS 2,116,537 A * 5/1938 Miller .................... B01D 24/04
                                                        210/505
3,343,680 A * 9/1967 Rice ....................... B01D 23/10
                                                        210/263

(Continued)

FOREIGN PATENT DOCUMENTS

CN    1226182    8/1999
CN    1260235    7/2000
(Continued)

OTHER PUBLICATIONS

Search report from International Patent Application No. PCT/JP2012/074253, mail date is Oct. 30, 2012.
(Continued)

*Primary Examiner* — Matthew O Savage
(74) *Attorney, Agent, or Firm* — Greenblum & Bernstein, P.L.C.

(57) ABSTRACT

A filter medium layer includes filter media configured to capture suspended solids contained in a liquid to be treated and filtering aids configured to allow the suspended solids contained in the liquid to be treated to pass through the filtering aids. The filter media and the filtering aids are mixed together and the liquid to be treated is filtered by being passed through the filter media and the filtering aids as mixed together. A filter device includes the filter medium layer and a filter tank configured to accommodate the filter medium layer.

19 Claims, 20 Drawing Sheets

(51) Int. Cl.
*B01D 24/12* (2006.01)
*B01D 24/16* (2006.01)
*B01D 39/08* (2006.01)
*B01D 39/16* (2006.01)
*B01D 39/02* (2006.01)
*B01D 39/06* (2006.01)
*B01D 39/04* (2006.01)

(52) U.S. Cl.
CPC ....... B01D 39/083 (2013.01); B01D 39/1676 (2013.01); *B01D 39/02* (2013.01); *B01D 39/04* (2013.01); *B01D 39/06* (2013.01)

(58) Field of Classification Search
USPC .......................................... 210/263, 503, 505
See application file for complete search history.

(56) References Cited

U.S. PATENT DOCUMENTS

| | | | | |
|---|---|---|---|---|
| 3,617,566 | A * | 11/1971 | Oshima | B01D 17/0202 210/242.4 |
| 5,248,415 | A * | 9/1993 | Masuda | B01D 24/002 210/154 |
| 5,427,683 | A * | 6/1995 | Gershon | B01D 35/12 210/264 |
| 6,521,125 | B1 * | 2/2003 | Schillereff | B01D 17/0202 210/266 |
| 7,967,992 | B2 * | 6/2011 | Patil | B01D 24/00 210/263 |

FOREIGN PATENT DOCUMENTS

| | | |
|---|---|---|
| CN | 101528320 | 9/2009 |
| EP | 0279975 | 8/1988 |
| JP | 64-007920 | 1/1989 |
| JP | 7-232007 | 9/1995 |
| JP | 7-284355 | 10/1995 |
| JP | 2001-38107 | 2/2001 |
| JP | 2001-269509 | 10/2001 |
| JP | 2002-11305 | 1/2002 |
| JP | 2003-200009 | 7/2003 |
| JP | 2004298821 A * | 10/2004 |
| JP | 2005-103362 | 4/2005 |
| JP | 3730441 | 1/2006 |
| JP | 3994392 | 10/2007 |

OTHER PUBLICATIONS

China Office action, dated Nov. 25, 2014 along with an English translation thereof.

Office Action issued in Taiwan Counterpart Patent Appl. No. 10520079730, dated Jan. 22, 2016, along with a partial English translation thereof.

* cited by examiner

4d

5a

5b

5c

105a

105b

105c

105d

FILTER MEDIUM LAYER AND FILTER DEVICE PROVIDED WITH SAME

TECHNICAL FIELD

The present invention relates to a filter medium layer for separating and removing suspended solids contained in a liquid to be treated (raw water), and a filter device provided with the same.

BACKGROUND ART

Many filter devices each having a filter medium layer formed of granular filter media are used for solid-liquid separation and biotreatment equipment. The above filter devices perform surface filtration in which suspended solids in a liquid to be treated are mainly captured on a surface of the filter medium layer. In the surface filtration, the captured suspended solids are accumulated on the surface of the filter medium layer, and cause clogging of the filter medium layer even when the entire filter medium layer is not effectively utilized. For this reason, a filtration pressure rises in a short time and the filter media needs cleaning frequently. When flow passages (gaps between adjacent gains of the filter media) in the filter medium layer are narrow, poor balance in the filter medium layer makes surface filtration likely to occur. In depth filtration, suspended solids in a liquid to be treated are captured not only on the surface of the filter medium layer but also inside of the filter medium layer. Such depth filtration is less likely to undergo a rise in the filtration pressure in the filter medium layer and captures a large amount of solids per cycle. When flow passages, through which the suspended solids can pass, are formed deep inside the filter medium layer, the entire filter medium layer can be effectively utilized.

As an example of filter media included in the filter medium layer, Patent Literature 1 proposes a filter device in which a filter medium layer having a certain thickness is formed of indefinite form granular or fiber filter media being porous there inside, and suspended solids contained in a liquid to be treated are captured in the insides and on the surfaces of the filter media.

Patent Literature 2 proposes a filter device in which granular materials such as sand and anthracite, which are different in specific gravity and grain size, are formed into multiple layers to capture large suspended solids in large gaps formed by grains having a large effective diameter and to capture small suspended solids in small gaps formed by grains having a small effective diameter.

Also, Patent Literature 3 proposes a filtration method capable of maintaining filtration performance over a long period of time while suppressing filtration pressure rise by forming a filter medium layer by mixing two kinds of filter media different in grain size (a grain size a and grain sizes 3 to 5a) in appropriate amounts and thereby adjusting gaps between the filter media. In Patent Literature 3, for example, foam polystyrene filter media having a specific gravity of 0.1 and a grain size of 0.6 mm and having a specific gravity of 0.1 and a grain size of 2.8 mm are used as the two kinds of granular filter media. Patent Literature 3 describes a floating filtration method with less pressure loss for a long period of time and a large amount of SS to be captured, using a filter tank in a state where the two kinds of granular filter media are stirred and mixed without two kinds of floating filter medium grains separated from each other.

Patent Literature 4 proposes a depth filtration technology using cylindrical filter media with a high void ratio.

There has been known a sand filter device using both granular active carbon and garnet. For example, Patent Literature 5 discloses a filter device which performs downward-flow filtration process with a first filter medium layer filled with sand or garnet having a grain size of 0.45 to 0.8 mm, or both the sand and garnet in a multi-layer, and with a second filter medium layer filled with granular active carbon or anthracite having a grain size of 0.9 to 1.6 mm and formed on a support member above the first filter medium layer.

There has been known a filter device which performs solid-liquid separation and biotreatment using resin filter media, fiber filter media and the like. For example, as primary effluent treatment equipment using resin filter media, Patent Literature 6 discloses an upward-flow type solid-liquid separator in which a filter medium layer inside a treatment tank is filled with small cylindrical filter media each having a void ratio of 70% or more and a specific gravity of 1.0 or less.

As a flowable filler for use in an aeration chamber for biotreatment or the like, Patent Literature 7 discloses a water treatment filler which is made of synthetic resin having a specific gravity of 0.800 to 0.999, has a large surface area and appears to be approximately spherical.

As fiber filter media which separate suspended solids contained in a sewage, Patent Literature 8 proposes water treatment fiber filter media each made of a twisted filter medium produced by interlacing filaments with core and press yarns twisted together, and by performing heat treatment on the resultant yarns.

CITATION LIST

Patent Literature

[PTL 1] Japanese Patent Application Publication No. 2002-011305
[PTL 2] Japanese Patent Application Publication No. Hei 7-284355
[PTL 3] Japanese Patent Application Publication No. Hei 7-232007
[PTL 4] Japanese Patent Application Publication No. Hei 1-007920
[PTL 5] Japanese Patent Application Publication No. 2001-38107
[PTL 6] Japanese Patent Application Publication No. Sho 64-7920
[PTL 7] Japanese Patent No. 3730441
[PTL 8] Japanese Patent No. 3994392

SUMMARY OF INVENTION

In the case of performing a filtration operation using granular or fiber filter media, it is difficult to select filter media for a liquid to be treated. In a filter medium layer formed of such filter media, a capture zone of suspended solids advances from a surface layer portion of the filter medium layer gradually over time in a flow direction of the liquid to be treated. Also, the fiber filter media are compacted by a filtration pressure, and accordingly undergoes reduction in flow passages.

Use of fiber filter media each having narrow flow passages between fibers constituting the substance in the filter medium enables clarifying filtration in which a large amount of suspended solids are captured. However, the filtration results in surface filtration in which a large amount of suspended solids are captured by the filter media near the surface of the filter medium layer. This causes clogging quickly and the filtration pressure is increased. The operation advances to a cleaning process based on a predetermined filtration pressure or a predetermined filtration duration time. However, since a deepest portion of the filter medium layer is not effectively utilized for filtration, the number of the cleaning processes is increased for the amount of suspended solids captured, and thus a treatment amount is reduced. Furthermore, since the gaps between the filter media need to be adjusted depending on the liquid to be treated, it is required to select filter media each having an appropriate grain size and to adjust a compaction degree of the filter medium layer according to an injection pressure of the liquid to be treated.

Use of fiber filter media each having wide flow passages between fibers constituting the substance in the filter medium or fiber filter media each having strength enough not to be compacted by the filtration pressure enables depth filtration in which the capture zone advances down to the deepest portion of the filter medium layer. While the filtration pressure is not significantly increased, the quality of the treated liquid is poor and the suspended solids contained in the liquid to be treated flow out together with the treated liquid even in an early stage after the start of filtration (a breakthrough phenomenon).

In the filter device having a multi-layer of filter media being granular materials such as sand and anthracite, which are different in specific gravity and grain size, suspended solids in a liquid to be treated are captured in such a manner that those having a large grain size are first captured by a coarse-grain filter medium layer and then those having a small grain size are sequentially captured while flowing to and through a fine-grain filter medium layer. This results in depth filtration with effective utilization of the entire filter medium layer. However, the treatment speed is low because only the gaps between the filter media are used as the flow passages inside the filter tank. In terms of filter medium cleaning, cleaning by backwashing needs injection of a fluid under high pressure. Also, cleaning by stirring requires the filter media to have a large difference in specific gravity so that the multiple layers can be formed after the cleaning. In this case, a large power to stir filter media each having a large specific gravity is required. There is a possibility that lumps of suspended solids in the gaps, which have failed to be released during the filter medium cleaning, are left in the filled layer.

The filter medium layer formed by mixing two kinds of filter media different in grain size (the grain size a and grain sizes 3 to 5a) inappropriate amounts is intended to efficiently capture the suspended solids throughout the entire filter medium layer by adjusting a distribution of gaps between the filter media. In the filter medium layer formed of only the filter media each having a large grain size (3 to 5a), depth filtration is performed because of large gaps between the filter media, but the amount of suspended solids captured is so small that the breakthrough phenomenon may occur. On the other hand, in the filter medium layer formed of only the filter media each having a small grain size (a), the amount of suspended solids captured is large, but surface filtration is performed because of narrow gaps between the filter media. Accordingly, the filtration pressure is increased in a short period of time, resulting in a need for frequent filter medium cleaning. In contrast, mixing of filter media having large and small grain sizes averages out the gaps between the filter media, so that the resultant filtration performance is the same as that achieved by a filter medium layer formed of filter media having an average grain size of the two grain sizes.

A high-speed filter device such as a sand filter device and a fiber filter device is a depth filter device in which a filter medium layer is formed to have a certain thickness and suspended solids are captured inside the filter medium layer. However, coarse filter media cannot capture the suspended solids and lets the suspended solids flow out. On the other hand, too dense a filter medium layer results in surface filtration. The filter media needs to be selected according to properties of a liquid to be treated (raw water) and treatment conditions. However, it is difficult to prepare various kinds of filter media. For this reason, there is a need for filter media applicable to a liquid to be treated having standard properties, such as a sewage effluent. Such standard filter media cannot exert a sufficient depth filtration function for a liquid to be treated, which is likely to cause surface filtration as in coagulation filtration or the like, since the entire filter medium layer cannot be used, resulting in reduction in filtration duration time and increase in cleaning frequency. Therefore, development and application of dedicated filter media are required. Even when only one kind of dedicated filter media different from the standard filter media is developed, such filter media cannot be said to be optimum filter media if likelihood of surface filtration is at a middle level. Moreover, in the case of a high-turbidity liquid to be treated such as river water immediately after rain, it is necessary to develop and apply dedicated coarse filter media for an optimum material to treat the liquid. When the configuration of the filter medium layer deviates from optimum conditions, the filter device is operated at a throughput below its standard performance or the filter medium cleaning frequency is increased. However, the performance is significantly deteriorated depending on circumstances.

In the floating filtration method using the two kinds of filter media described in Patent Literature 3, the filter medium layer is formed, in which two kinds of floating filter medium grains are mixed without being separated from each other. Therefore, pressure loss during filtration is small over along period of time, and the amount of SS captured is increased. As to the conventional filter medium layer in which filter media different in size, specific gravity and the like are mixed, large passages are reduced by dispersing filter media different in grain size. These filter media are to capture suspended solids and not to carry the suspended solids deep inside the filter medium layer.

In the sand filter device, a technique of forming a deep filter medium layer using several kinds of filter media having large and small grain sizes is widely used in water purification and the like. As described in Patent Literature 5, two or more kinds of filter media different in grain size and specific gravity are used in combination to form filter medium layers for the respective filter media. In the sand filter device using two or more kinds of filter media in combination, the suspended solids contained in the liquid to be treated are selectively captured in stages for the respective particle sizes of the suspended solids. Therefore, the suspended solids in the liquid to be treated are not captured across the entire thickness of the filter medium layer by flowing some of the particles into the filter medium layer. In the sand filter device using the multilayer filter medium layer, relatively large particles are captured in a filter medium layer having filtration grains forming large voids, while relatively small particles are captured in a filter medium layer having filtration grains forming small voids.

As to small cylindrical filter media as described in Patent Literature 6, a filter medium layer is formed of small cylindrical plastic filter media each having a void ratio of 70% or more and a specific gravity of 1.0 or less and a liquid is passed therethrough as an upward flow. Each of the small cylindrical filter media has a very large void ratio and sterically captures the suspended solids in the entire filter medium layer rather than capturing only on the lower surface of the filter medium layer. Thus, the ability to retain the suspended solids is improved, and a long operation can be performed. The sand filter device has a high removal rate of suspended solids for low-concentration drain such as a secondary effluent in a sewage treatment plant, and exerts excellent performance with a high filtration speed. However, when the sand filter device is used for primary effluent, clogging of a surface of a filter sand surface layer forming the filter medium layer occurs in a short time due to a small void ratio.

A high-speed filter device using fiber filter media is a deep filter device in which a filter medium layer having a certain thickness is formed and suspended solids in a liquid to be treated are captured inside the filter medium layer. When normal filtration is continued, a capture zone gradually advances from the surface of the filter medium layer in a flow direction of the liquid to be treated. When filtration pressure loss associated with capturing of the suspended solids does not reach a predetermined pressure, the capture zone advances deep inside the filter medium layer, resulting in a breakthrough phenomenon in which a large amount of suspended solids flow out. After the filtration process is terminated upon detection of the breakthrough by monitoring the turbidity of the treated water, a filter medium cleaning process is performed or the cleaning process is performed at predetermined time intervals using a timer. Instead, when the filtration pressure loss associated with capturing of the suspended solids reaches the predetermined pressure before breakthrough, the filtration process is terminated without using the entire filter medium layer and then the filter medium cleaning process is started.

The filter devices described above can perform depth filtration and exert predetermined filtration performance by selecting filter media suitable for properties of each liquid to be treated and conditions. However, there are various kinds of liquids to be treated, such as inorganic and organic liquids. Therefore, it is necessary to prepare filter media meeting requirements such as a void ratio inside each of the filter media and strength of each of the filter media. Thus, production and inventory control thereof are difficult and complicated.

It is an object of the present invention to provide a filter medium layer which eliminates the need to select filter media according to a liquid to be treated and realizes a long filtration duration time, and also to provide a filter device using the same.

An embodiment of the present invention is a filter medium layer including filter media configured to capture suspended solids contained in a liquid to be treated and filtering aids configured to allow the suspended solids contained in the liquid to be treated to pass through the filtering aids, wherein the filter media and the filtering aids are mixed together and wherein the liquid to be treated is filtered by being passed through the filter media and the filtering aids as mixed together.

According to the above configuration, the liquid to be treated can be easily passed into the inside of the filter medium layer through the filtering aids, and thus not only the surface of the filter medium layer but also the inside thereof can be effectively utilized for filtration. Moreover, the filtration duration time can be increased without the need to select filter media according to the liquid to be treated.

Each of the filtering aids may have voids allowing the suspended solids to always easily pass through an inside of the filtering aid.

According to the above configuration, the liquid to be treated can be easily passed into the inside of the filter medium layer through the filtering aids.

Each of the filtering aids may be formed of fibers.

According to the above configuration, since the suspended solids can always easily pass through the filtering aids, the liquid to be treated can be adequately passed into the filter medium layer, thereby enabling depth filtration using the entire filter medium layer.

Each of the filtering aids may have a hollow inside and two or more openings on a peripheral wall of the filtering aid.

According to the above configuration, since the suspended solids can always pass through the filtering aids, the liquid to be treated can be adequately passed into the filter medium layer, thereby enabling depth filtration using the entire filter medium layer.

Each of the filtering aids may partly have upright fibers standing upright to capture the suspended solids.

According to the above configuration, the suspended solids can be effectively captured in the gaps between the filter media and the filtering aids and thus clarifying filtration can be facilitated.

Each of the filtering aids may have a rectangular, spherical, or cylindrical shape.

According to the above configuration, various shapes can be adopted as the filtering aid.

Each of the filter media may be formed of fibers.

According to the above configuration, the suspended solids can be captured in both of the gaps between the filter media and the voids in the filter media.

Each of the filter media may be formed in a solid granular shape.

According to the above configuration, the suspended solids can be captured in the gaps between the filter media.

Each of the filter media may be formed of wave-shaped filament fibers bonded to each other with a large amount of voids in the filter medium, the fibers inside each of the filter media may be dense so as to capture the suspended solids between the fibers, and each of the filtering aids may be formed of fibers coarser than the fibers inside each of the filter media and have strength enough not to be compacted by a filtration pressure.

According to the above configuration, the liquid to be treated can be adequately passed into the filter medium layer, thereby enabling depth filtration using the entire filter medium layer.

Each of the filtering aids may be configured to have internal voids larger than the voids in each of the filter media during filtration of the liquid to be treated.

According to the above configuration, even when the filtration pressure is increased and the filter medium layer is compacted, flow passages into the filter medium layer can be secured through the filtering aids.

Each of the filter media may be made of thermoplastic resin.

According to the above configuration, solid granular filter media having the same shape and specific gravity can be mass-produced.

Each of the filter media may be made of softened resin with closed pores.

According to the above configuration, since the specific gravity is small, the filter media do not sink even when the suspended solids adhere to the filter media in the surface layer of filtration. Thus, an appropriate thickness of the filter layer can be maintained.

The filter media may be filter sand, garnet, anthracite or a combination thereof.

According to the above configuration, various solid granular materials can be adopted as the filter media.

The filter media and the filtering aids may be floatable in the liquid to be treated, and a direction of passing the liquid to be treated through the filter medium layer may be from a lower side to an upper side in a direction of gravitational force.

According to the above configuration, a filter medium layer which can be used in an upward-flow type filter device can be realized.

The filter media and the filtering aids may be sinkable in the liquid to be treated, and a direction of passing the liquid to be treated through the filter medium layer may be from an upper side to a lower side in the direction of gravitational force.

According to the above configuration, a filter medium layer which can be used in a downward-flow type filter device can be realized.

Each of the filter media and each of the filtering aids may have a specific gravity of 0.1 or more and less than 1.0 when a specific gravity of the liquid to be treated is 1.0.

According to the above configuration, a filter medium layer which can be used in the upward-flow type filter device can be realized.

Each of the filter media and each of the filtering aids may have a specific gravity of 1.0 or more and less than 3.0 when a specific gravity of the liquid to be treated is 1.0.

According to the above configuration, a filter medium layer which can be used in the downward-flow type filter device can be realized.

The filtering aids may be evenly dispersed.

According to the above configuration, the liquid to be treated including the suspended solids can be adequately passed into the filter medium layer, and the entire filter medium layer can be used as a capture zone. Thus, depth filtration using the entire filter medium layer can be realized.

A larger amount of the filtering aids may be mixed on an upstream side than on a downstream side of the filter medium layer.

According to the above configuration, a filtration pressure rise in a short time can be prevented while making it less likely for clogging to occur near the surface layer and delaying clogging of the filter media near the surface layer. Accordingly, the liquid to be treated is allowed to actively flow into the filter medium layer. Thus, depth filtration using the entire filter medium layer can be realized.

A volume mixing ratio of the filter media and the filtering aids may be 0.95 to 0.5:0.05 to 0.5.

According to the above configuration, while preventing a breakthrough phenomenon, the amount of SS captured in the entire filter medium layer can be maintained, and stable depth filtration can be performed utilizing the entire filter medium layer.

An embodiment of the present invention is a filter device including the filter medium layer and a filter tank configured to accommodate the filter medium layer.

DESCRIPTION OF EMBODIMENTS

A filter device according to an embodiment of the present invention will be described in detail with reference to the drawings. Note that, in FIGS. 2, 3, 12, 13, 16, 21, 22, 25, 30 and 31, a vertical direction in each drawing is the direction of gravitational force. Also, a downward direction in each drawing is downward in the direction of gravitational force, while an upward direction in each drawing is upward in the direction of gravitational force.

First Embodiment

Each of filter devices 1A and 1B according to a first embodiment separates and removes suspended solids contained in a liquid to be treated such as living drainage (wastewater) and industrial drainage (wastewater), for example, with a filter medium layer 3 using a plurality of filter media bodies 4 and a plurality of filtering aids bodies 5. Note that the filter medium layer means a filter medium layer made of a filtering material (assembly of the filter media and the filtering aids). The plurality of filter media bodies 4 are in contact with one another and are separable from one another. The filter medium layer 3 is configured to capture suspended solids contained in a liquid to be treated in gaps between the filtering bodies. The plurality of filtering aids bodies 5 are in contact with adjacent ones of the filter media bodies and are separable from each other and from the filter media bodies. The filtering aids bodies 5 are configured to allow the suspended solids contained in the liquid to be treated to pass through the filtering aids bodies.

Figure 1:
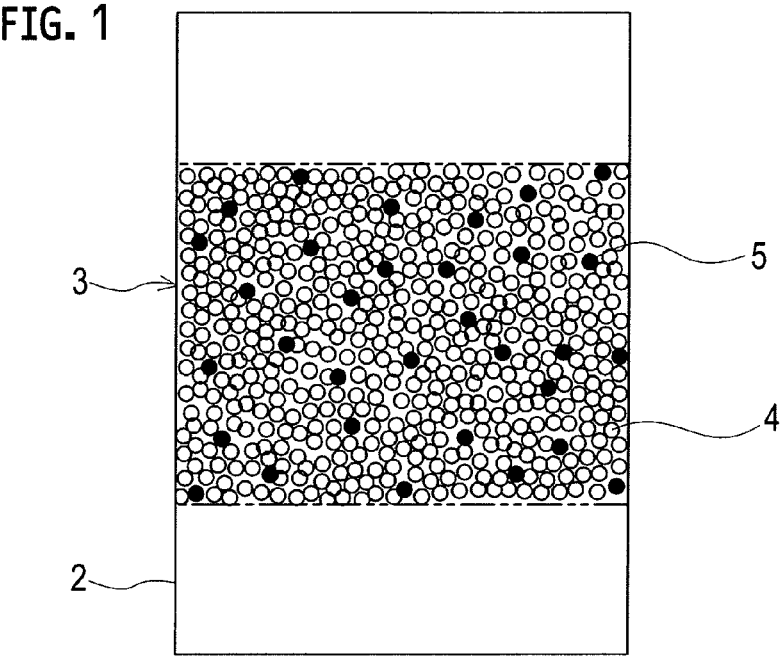
FIG. 1 is a schematic configuration diagram of an evenly dispersed filter medium layer in a filter device according to a first embodiment.
Figure 2:
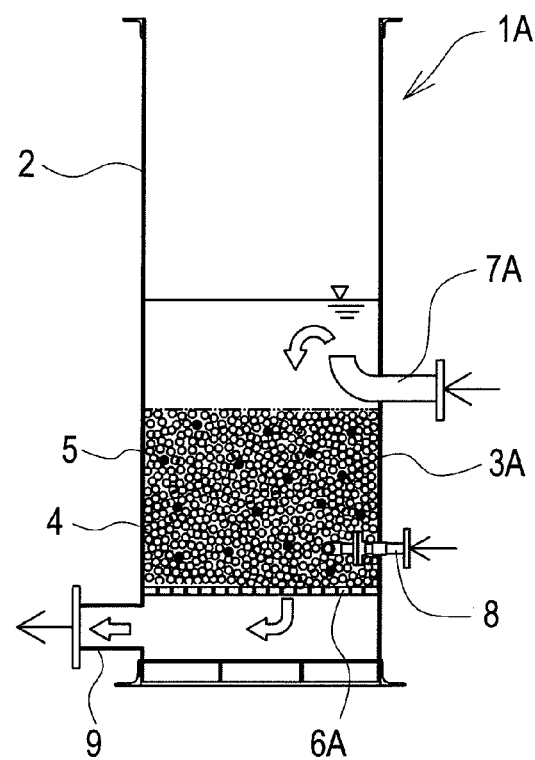
FIG. 2 shows a downward-flow type filter device.
Figure 3:
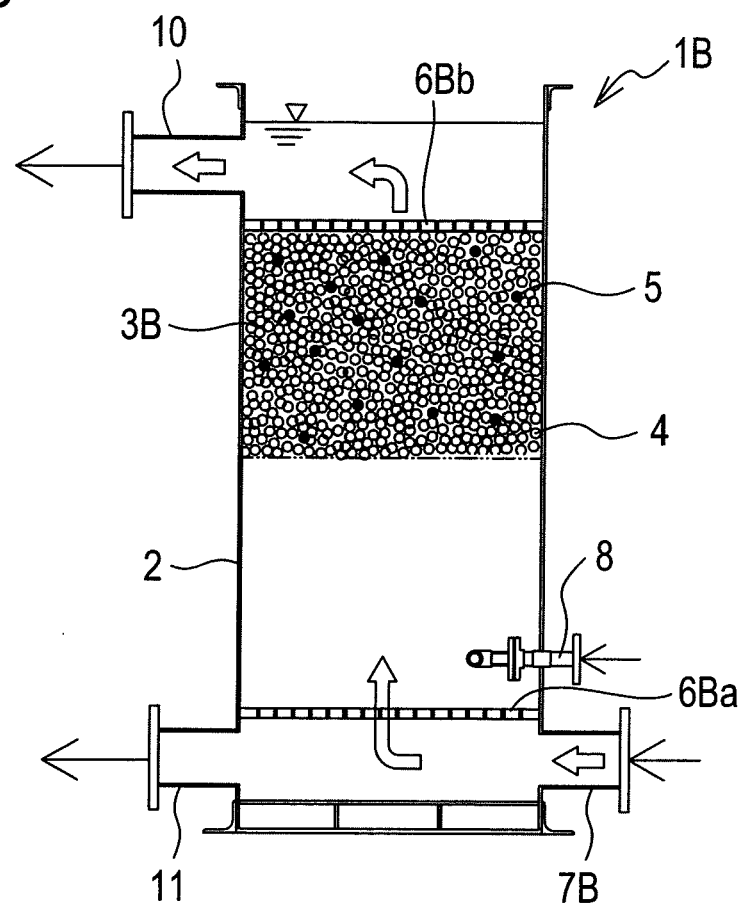
FIG. 3 shows an upward-flow type filter device.

FIG. 1 is a schematic configuration diagram of the filter medium layer 3. A filter tank 2 is filled with the filter media 4 and the filtering aids 5 to form the filter medium layer 3 in a state where the filter media and the filtering aids are mixed. When the specific gravity of the filter media 4 and the filtering aids 5 is each 1.0 or more, a filter medium layer 3A is formed in a lower part of the filter tank 2 as shown in FIG. 2, resulting in the filter device 1A of a downward-flow type. On the other hand, when the specific gravity of the filter media 4 and the filtering aids 5 is each less than 1.0, a filter medium layer 3B is formed in an upper part of the filter tank 2 as shown in FIG. 3, resulting in the filter device 1B of an upward-flow type.

FIGS. 4 to 7 are schematic diagrams of filter media according to the first embodiment. In this embodiment, the filter medium 4 is formed of a fiber filter medium, which is formed by bonding wave-shaped filament fibers to each other so as to have a large amount of voids therein. Since the liquid to be treated can pass, together with the suspended solids, through the internal voids of the filter medium 4, high-speed filtration can be performed. The fibers inside the filter medium 4 are dense and thus can capture the suspended solids therebetween. Since the fibers stand upright on a surface of the filter medium 4, the suspended solids passing between the filter media 4 and 4 can also be captured on the surface of the filter medium 4.

When the filter medium layer 3 is formed and the liquid to be treated is passed therethrough, the fiber filter medium 4 having voids therein is moderately compressed and filled. As a result, gaps between the filter media 4 and 4 can be uniformly maintained and thus efficient filtration can be performed.

Figure 4:
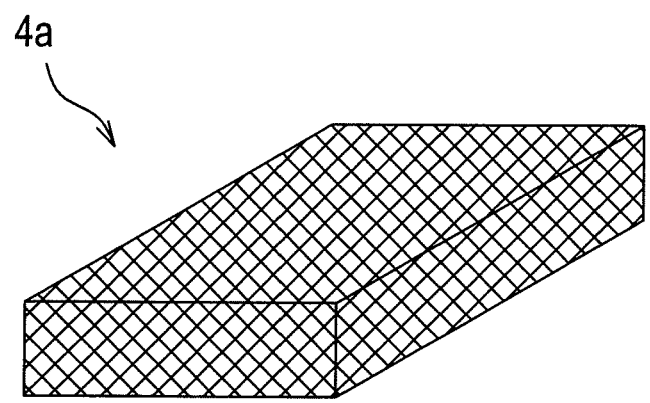
FIG. 4 is a schematic diagram of a rectangular fiber filter medium.

FIG. 4 shows a rectangular fiber filter medium 4a. The rectangular fiber filter medium 4a is formed in a rectangular shape by cutting a large mat-shaped medium into finite form pieces. The rectangular fiber filter medium 4a is made of fibers, and thus the suspended solids can be captured by the fibers standing upright on the surface of the rectangular fiber filter medium 4a or between the fibers inside the rectangular filter medium 4a. When the filter medium layer 3 is formed by filling the rectangular fiber filter media 4a in the filter tank 2, gaps of various sizes are formed between the filter media 4a and 4a. Accordingly, the liquid to be treated is passed through the filter medium layer 3 while capturing the suspended solids in the gaps.

Figure 5:
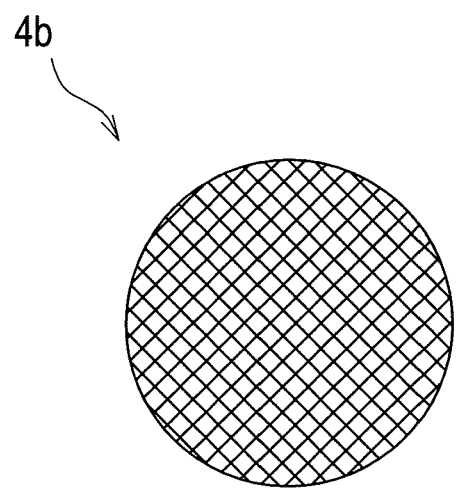
FIG. 5 is a schematic diagram of a spherical fiber filter medium.

FIG. 5 shows a spherical fiber filter medium. 4b according to a modified example of this embodiment. The spherical fiber filter medium 4b is formed in a spherical shape, and is made of fibers as in the case of the rectangular fiber filter medium 4a. Thus, the suspended solids can be captured by the fibers standing upright on the surface of the spherical fiber filter medium 4b or between the fibers inside the spherical fiber filter medium 4b. The spherical fiber filter medium 4b may carry a large number of bacteria in its large surface area, for example. In this case, such bacteria enables effective breakdown of contamination. The spherical fiber filter medium 4b also has a characteristic of preventing clogging by moving the suspended solids contained in the liquid to be treated between the spherical fiber filter media 4b.

Figure 6:
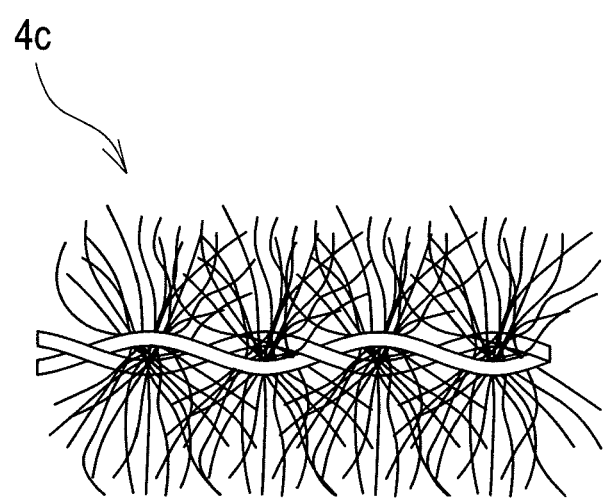
FIG. 6 is a schematic diagram of a twisted fiber filter medium.

FIG. 6 shows a twisted fiber filter medium 4c according to a modified example of this embodiment. The twisted fiber filter medium 4c is formed in a twisted shape, and is made of fibers as in the case of the rectangular fiber filter medium 4a. Thus, the suspended solids can be captured by the fibers standing upright on the surface of the twisted fiber filter medium 4c or between the fibers inside the twisted fiber filter medium 4c. The twisted fiber filter medium 4c facilitates scattering and spreading of captured portions of the suspended solids, and enables grains captured between implanted fibers to come off or fall off with a very small energy.

Figure 7:
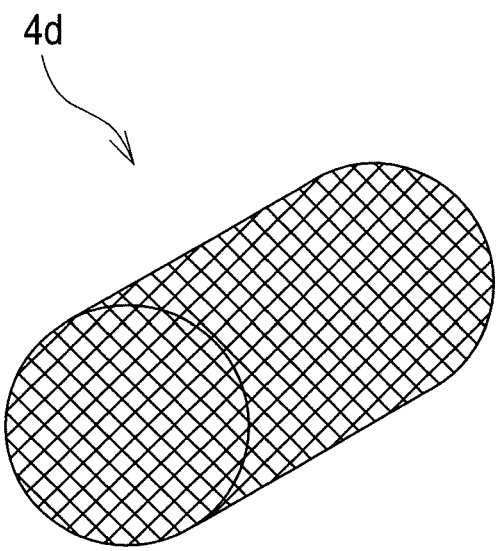
FIG. 7 is a schematic diagram of a cylindrical fiber filter medium.

FIG. 7 shows a cylindrical fiber filter medium 4d according to a modified example of this embodiment. The cylindrical fiber filter medium 4d is formed in a cylindrical shape, and is made of fibers as in the case of the rectangular fiber filter medium 4a. Thus, the suspended solids can be captured by the fibers standing upright on the surface of the cylindrical fiber filter medium 4d or between the fibers inside the cylindrical fiber filter medium 4d.

FIGS. 8 to 11 are schematic diagrams of filtering aids according to the first embodiment. The filtering aid 5 of this embodiment is made of coarse fibers and has voids or openings which are enough for the liquid to be treated including the suspended solids to pass from one side to the other side of the filtering aid 5. Since the filtering aids 5 are mixed in the filter medium layer 3 formed of the filter media 4, the suspended solids not captured in the filter medium layer 3 on the upstream side of the filtering aids 5 are passed toward the downstream side together with the liquid to be treated. Then, the suspended solids passing through the filtering aids 5 are captured in the filter medium layer 3 on the downstream side.

Even after many suspended solids are captured on a surface S (see FIG. 12) of the filter medium layer 3, an adequate amount of the filtering aids 5 mixed in the filter medium layer 3 can secure a flow passage into the filter medium layer 3, making it hard for a filtration pressure to rise. The filtering aids 5 guide the liquid to be treated into the filter medium layer 3 and facilitates depth filtration inside the filter medium layer 3. As a result, a long filtration time can be set for one filtration process and thus a filtration amount is increased.

The filtering aid 5 is formed to have a structure that can maintain its shape even when compacted, such as a structure using a member having strength or a structure having an increased fiber diameter, for example. To be more specific, the filtering aid 5 may be formed of synthetic resin or synthetic fibers such as plastic.

The filtering aid 5 has voids much larger than those in the filter medium 4 therein and has at least two or more openings communicated with the inside thereof. The internal voids and openings of the filtering aid 5 are large enough for the liquid to be treated including the suspended solids to pass therethrough. The liquid to be treated including the suspended solids flows in through one of the openings of the filtering aid 5, passes through the internal voids and then flows out through the other opening. The shapes, sizes and the like of the internal voids and openings of the filtering aid 5 are not specified as long as the voids and openings are large enough so that the liquid can pass toward the downstream side of the filter medium layer 3 after passing through the internal voids of the filtering aid 5 from the opening. The openings communicating the inside with the outside may be provided in two or more spots at symmetrical positions. The filtering aid 5 may be formed to be hollow inside and have openings provided on its peripheral wall.

The member constituting the filtering aid 5 is not easily deformed by compression even when compacted inside the filter medium layer 3. Therefore, the filter medium layer 3 can always secure flow passages formed by the voids inside the filtering aids 5 even during a filtration operation.

When the size of the filtering aid 5 is set approximately the same as that of the filter medium 4, the gap between the filter media 4 and 4 becomes approximately the same as the gap between the filter medium 4 and the filtering aid 5. As a result, filtration (imbalanced filtration) with an uneven amount of the suspended solids to be captured in the filter medium layer 3 becomes less likely to occur.

The filtering aid 5 may have the fibers stand upright, partly, for example, on a surface of the filtering aid 5 so that the suspended solids can be captured on the surface of the filtering aid 5.

Figure 8:
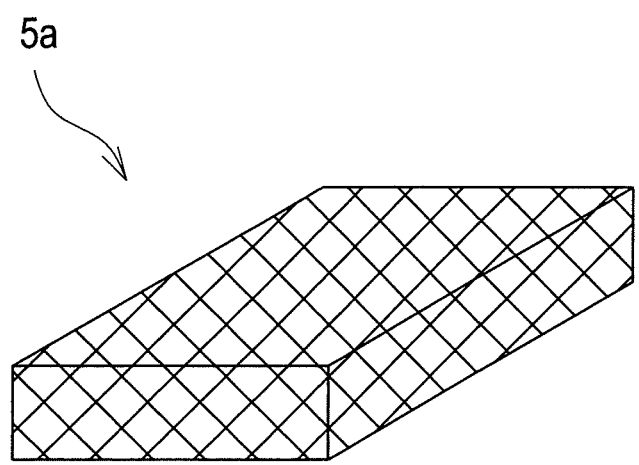
FIG. 8 is a schematic diagram of a rectangular filtering aid.

FIG. 8 shows a rectangular filtering aid 5a. Although the rectangular filtering aid 5a is formed in the same manner as the rectangular fiber filter medium 4a, fibers are coarser than those of the rectangular fiber filter medium 4a. The rectangular filtering aid 5a has voids therein, which are enough for the liquid to be treated including the suspended solids to pass.

Figure 9:
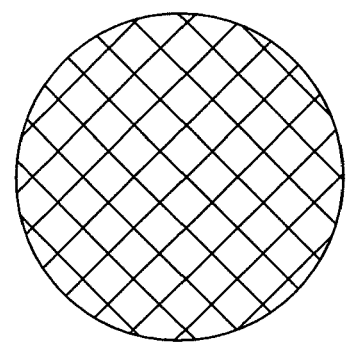
FIG. 9 is a schematic diagram of a spherical filtering aid.

FIG. 9 shows a spherical filtering aid 5b according to a modified example of this embodiment. The spherical filtering aid 5b is formed in a spherical shape. Although the spherical filtering aid 5b is formed in the same manner as the spherical fiber filter medium 4b, fibers are coarser than those of the spherical fiber filter medium 4b.

Figure 10:
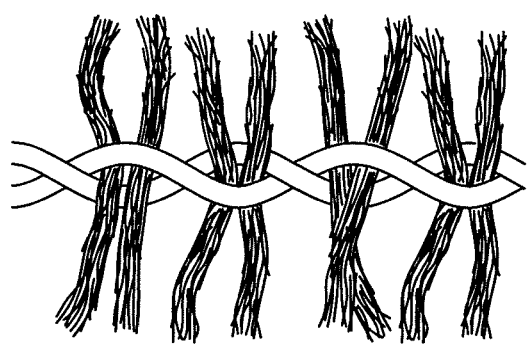
FIG. 10 is a schematic diagram of a twisted filtering aid.

FIG. 10 shows a twisted filtering aid 5c according to a modified example of this embodiment. The twisted filtering aid 5c is formed in a twisted shape. Although the twisted filtering aid 5c is formed in the same manner as the twisted fiber filter medium 4c, fibers are coarser than those of the twisted fiber filter medium 4c.

Figure 11:
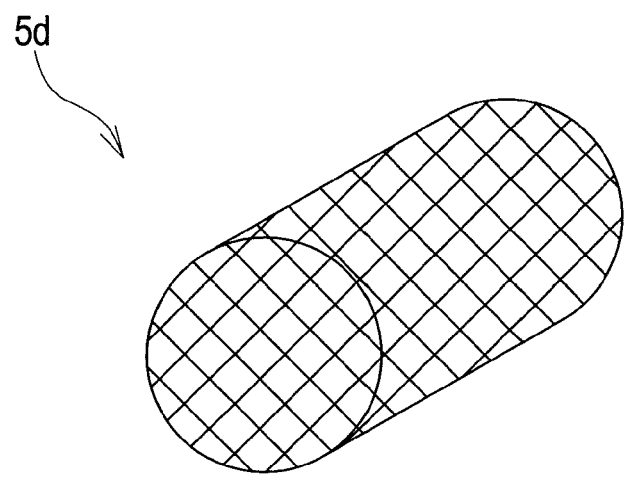
FIG. 11 is a schematic diagram of a cylindrical filtering aid.

FIG. 11 shows a cylindrical filtering aid 5d according to a modified example of this embodiment. The cylindrical filtering aid 5d is formed in a cylindrical shape. Although the cylindrical filtering aid 5d is formed in the same manner as the cylindrical fiber filter medium 4d, fibers are coarser than those of the cylindrical fiber filter medium 4d.

The filtering aids 5a to 5d shown in FIGS. 8 to 11 may have the strength increased by increasing the thickness of the fibers constituting the filtering aids, so that the shapes thereof are not deformed by the pressure of the liquid to be treated when the liquid is passed therethrough.

Figure 12:
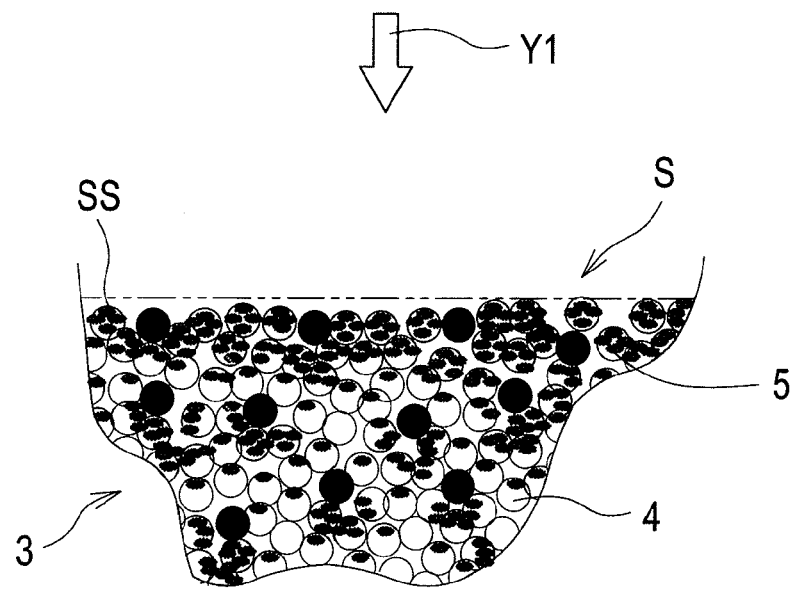
FIG. 12 is a partially enlarged view of a surface layer portion of the filter medium layer, showing a filtration state.

FIG. 12 is a partially enlarged view of an example of the filter medium layer 3. The filter media 4 and the filtering aids 5 are mixed to form the filter medium layer 3.

When the liquid to be treated is passed through the filter medium layer 3 in a direction indicated by the arrow Y1, a large amount of suspended solids SS are captured by the filter media 4 positioned near the surface S of the filter medium layer 3. The treated liquid having the suspended solids SS removed and the liquid to be treated including some suspended solids SS flow into the filter medium layer 3 while passing through the gaps between the filter media 4 and 4, the voids inside the filter media 4, the gaps between the filter media 4 and the filtering aids 5 or the voids inside the filtering aids 5. In this event, the suspended solids SS are captured in the voids inside the filter media 4, the gaps between the filter media 4 and 4 and the gaps between the filter media 4 and the filtering aids 5. Therefore, the amount of the suspended solids SS to be captured in the filter medium layer 3 is reduced from the upstream side toward the downstream side of the filter medium layer 3.

The filter medium layer 3 has the filtering aids 5 mixed therein, and thus the liquid to be treated can easily pass through the filtering aids 5. After the liquid passes through the filtering aids 5, the suspended solids SS are captured in the voids inside the filter media 4 or the gaps between the filter media 4 and 4 if there are filter media 4 on the downstream side. Then, the liquid to be treated further flows into the filter medium layer 3 while passing through the gaps between the filter media 4 and 4, the voids inside the filter media 4, the gaps between the filter media 4 and the filtering aids 5 or the voids inside the filtering aids 5. Accordingly, the suspended solids SS are captured by the filter media 4 inside the filter medium layer 3.

By passing the liquid to be treated including the suspended solids SS into the filter medium layer 3 through the filtering aids 5 as described above, efficient filtration can be performed also inside the filter medium layer 3. As a result, depth filtration can be realized with effective utilization of the entire filter medium layer 3.

As shown in FIG. 1, the filter media 4 and the filtering aids 5 are adequately dispersed when the specific gravity of the filter medium 4 and the filtering aid 5 is each 1.0 or more and less than 3.0 in the case of the downward-flow type filter device 1A and 0.1 or more and less than 1.0 in the case of the upward-flow type filter device 1B.

When a difference in specific gravity between the filter medium 4 and the filtering aid 5 is set to be small and the filter medium 4 and filtering aid 5 having the same shape are used as described above, the filter media and the filtering aids are evenly mixed to form the filter medium layer 3 and also evenly dispersed therein even after cleaning and stirring, as shown in FIG. 1.

On the other hand, when the difference in specific gravity between the filter medium 4 and the filtering aid 5 is set to be large or the filter medium 4 and filtering aid 5 having different shapes are used, more filter media 4 or filtering aids 5 can be mixed on one side (upstream side or downstream side) of the filter medium layer 3 because of the difference in specific gravity after stirring and cleaning.

Figure 13:
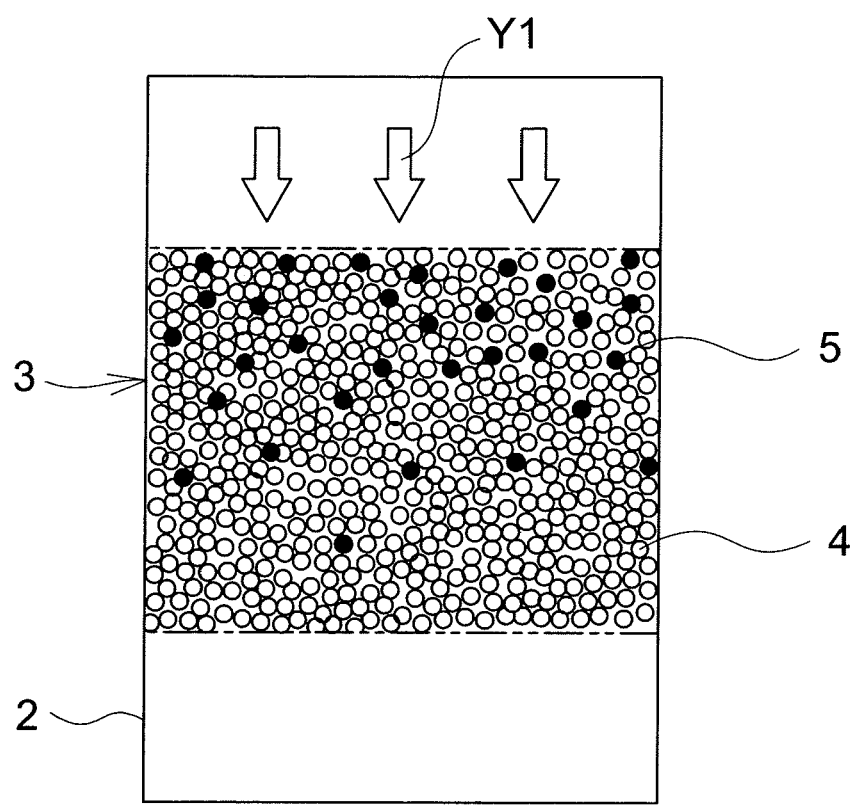
FIG. 13 is a schematic configuration diagram of a surface-dispersed filter medium layer.

To be more specific, when more filtering aids 5 are mixed on the upstream side of the filter medium layer 3, i.e., more filtering aids are dispersed in the surface layer as shown in FIG. 13, an increase in filtration pressure can be prevented near the surface layer where clogging of the filter media 4 is likely to occur. Accordingly, the suspended solids can be captured by allowing the liquid to be treated to actively flow into the filter medium layer 3.

Adjustment of the mixture ratio of the filter media 4 and the filtering aids 5 enables application to various liquids to be treated, resulting in no need to prepare various kinds of filter media 4 having different void ratios and sizes. The void ratio inside the filter medium 4 and the gaps between the filter media 4 and 4 can be set by adjusting the compaction degree of the filter medium layer 3 according to conditions.

When the specific gravity of the filter medium 4 and the filtering aid 5 is each 1.0 or more, the filter medium layer 3A settles at the lower part of the filter tank 1A (see FIG. 2). Thus, the liquid to be treated is passed by the downward flow. Meanwhile, when the specific gravity is each less than 1.0, the filter medium layer 3B floats in the upper part of the filter tank 1B (see FIG. 3). Thus, the liquid to be treated is passed by the upward flow.

FIG. 2 shows the downward-flow type filter device 1A. Inside the filter tank 2, a filter medium leakage prevention screen 6A is provided at a predetermined height from the lower end, which prevents leakage of the filter media 4 and the filtering aids 5. Above the filter medium leakage prevention screen 6A, the filter medium layer 3A having a predetermined thickness is formed of the filter media 4 and the filtering aids 5. When the filter media 4 and the filtering aids 5 are used to form the filter medium layer 3A, the fiber filter media 4 are adequately compressed and filled. Thus, the gaps between the filter media 4 and 4 can be evenly maintained, enabling efficient filtration.

A liquid-to-be-treated feed pipe 7A is connected to the filter tank 2 so as to feed the liquid to be treated to the upper side of the filter medium layer 3A.

A cleaner 8 is connected to a portion of the filter tank 2, which corresponds to the lower part of the filter medium layer 3A, in other words, above the filter medium leakage prevention screen 6A, so as to supply air into the filter tank 2 and stir and clean the filter media 4 included in the filter medium layer 3A with the air.

A discharge pipe 9 to discharge the liquid to be treated (water to be treated) or the like is connected to a portion, of the filter tank 2, below the filter medium leakage prevention screen 6A.

Next, description will be given of an example of filtration process performed by the filter device 1A.

After fed into the filter tank 2 from the liquid-to-be-treated feed pipe 7A, the liquid to be treated is filtered while flowing downward inside the filter medium layer 3A and is discharged through the discharge pipe 9.

When the filtration pressure is increased by clogging due to the suspended solids captured in the filter medium layer 3A or when an accumulated operating time of the filter device has reached a predetermined time or when the treated liquid no longer reaches its predetermined standards, for example, air is supplied by the cleaner 8.

When the liquid to be treated and the air are supplied into the filter tank 2, the filter media 4 are stirred by the air. The stirring of the filter media 4 cleans the filter media 4 and causes the suspended solids captured by the filter media 4 to come off and settle out to be discharged to the outside of the filter tank 2 through the discharge pipe 9. When the filter medium 4 and the filtering aid 5 are set to have approximately the same size, specific gravity and the like, the filtering aids 5 are also stirred during cleaning of the filter media 4. In cleaning of the filter media 4 (and the filtering aids 5), cleaning water which meets predetermined standards, e.g., the treated liquid (treated water) may be supplied as a cleaning liquid (cleaning water) to be supplied into the filter tank 2.

FIG. 3 is a schematic configuration diagram of the filter device 1B according to a modified example of this embodiment. The same or equivalent parts as or to those in FIG. 2 are denoted by the same reference numerals, and description thereof may be omitted.

FIG. 3 shows the upward-flow type filter device 1B. Inside the filter tank 2, a filter medium leakage prevention lower-side screen 6Ba is provided in the lower part of the filter tank 2, which prevents leakage of the filter media. Also, in the upper part of the filter tank 2, a filter medium leakage prevention upper-side screen 6Bb is provided to prevent leakage of the filter media 4. Below the filter medium leakage prevention upper-side screen 6Bb, the filter medium layer 3B having a predetermined thickness is formed of the filter media 4 and the filtering aids 5.

A liquid-to-be-treated feed pipe 7B is connected to the filter tank 2 so as to feed the liquid to be treated to below the filter medium leakage prevention lower-side screen 6Ba.

A cleaner 8 is connected to a portion of the filter tank 2, which corresponds to above the filter medium leakage prevention lower-side screen 6Ba, so as to supply air into the filter tank 2 and stir and clean the filter media 4 included in the filter medium layer 3B with the air.

A discharge pipe 11 to discharge the liquid to be treated (water to be treated) or the like is connected to a portion, of the filter tank 2, below the filter medium leakage prevention lower-side screen 6Ba.

A treated liquid discharge pipe 10 to discharge the treated liquid (treated water) is connected to a portion, of the filter tank 2, above the filter medium leakage prevention upper-side screen 6Bb.

The filter medium 4 and filtering aid 5 used in the filter device 1B have the specific gravity of less than 1.0.

Next, description will be given of an example of filtration process performed by the filter device 1B.

After fed into the filter tank 2 from the liquid-to-be-treated feed pipe 7B, the liquid to be treated is filtered while flowing upward inside the filter medium layer 3B and is discharged to the outside of the filter tank 2 through the treated liquid discharge pipe 10.

When the filtration pressure is increased by clogging due to the suspended solids captured in the filter medium layer 3B or when an accumulated operating time of the filter device has reached a predetermined time or when the treated liquid no longer reaches its predetermined standards, for example, air is supplied by the cleaner 8.

When the liquid to be treated and the air are supplied into the filter tank 2, the filter media 4 are stirred by the air. The stirring of the filter media 4 cleans the filter media 4 and causes the suspended solids captured by the filter media 4 to come off and settle out to be discharged to the outside of the filter tank 2 through the discharge pipe 9. When the filter medium 4 and the filtering aid 5 are set to have approximately the same size, specific gravity and the like, the filtering aids 5 are also stirred during cleaning of the filter media 4. In cleaning of the filter media 4 (and the filtering aids 5), cleaning water which meets predetermined standards, e.g., the treated liquid (treated water) may be supplied as a cleaning liquid (cleaning water) to be supplied into the filter tank 2.

Moreover, the filter media 4 are also applicable to a hermetically-sealed upward-flow type filter device, and exerts the same filtration performance as that described above. Also, the same cleaning effect can be achieved also in filter medium cleaning using stirring blades.

A comparative test was conducted using a relevant downward-flow type filter device having a filter medium layer formed of only the filter media 4 and the filter device 1A having the filter medium layer 3A formed by mixing the filter media 4 and the filtering aids 5 according to the first embodiment. Specifications of a liquid to be treated, flow speed, filter media, filtering aids, relevant filter device and filter device 1A used in the test are as follows.

Figure 14:
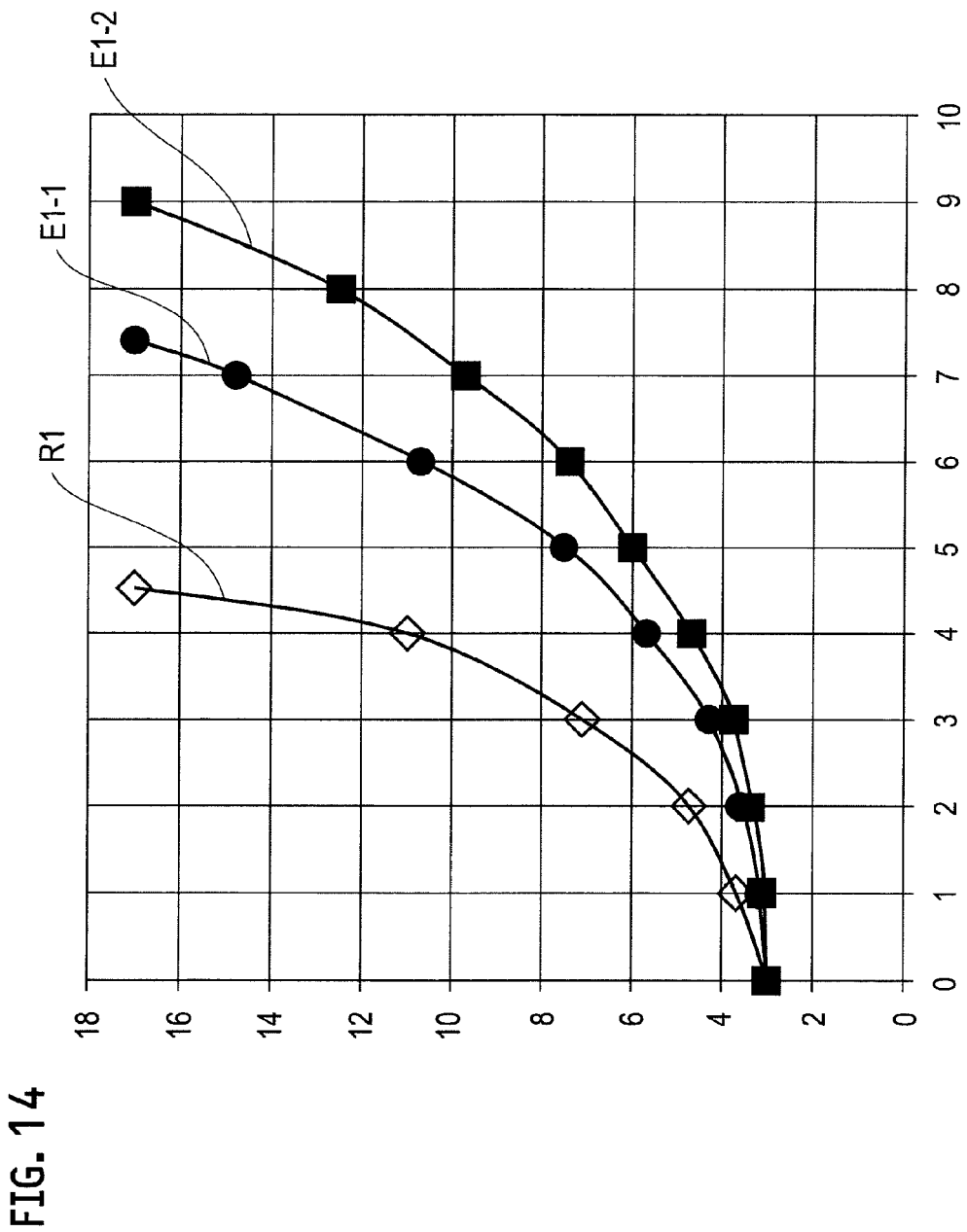
FIG. 14 is a comparison chart of a filtration pressure and a filtration duration time between the first embodiment and the related art.

Liquid to be treated: flocculated pond water or pond water containing algae
Filter medium: twisted fiber filter medium 4c
twisted fiber of 5 mm in diameter and 15 mm in length
Filtering aid: twisted filtering aid 5c
twisted fiber of 5 mm in diameter and 15 mm in length
Main body tank height: 4000 mm
Main body tank inside diameter: 600 mm in diameter
Flow speed: 40 m/h FIG. 14 is a graph showing the result of comparison of the filtration pressure and filtration duration time between the filter device 1A of the first embodiment and the relevant filter device. In FIG. 14, the vertical axis represents the filtration pressure (kPa) and the horizontal axis represents the filtration duration time (h). Normally, when the filtration pressure rises to 15 kPa, filter medium cleaning is required to remove suspended solids from the filter media 4.

In the relevant filter device (the line denoted by R1 in FIG. 14) having the filter medium layer formed of only the filter media 4, the filtration pressure rose to 15 kPa within 4.5 hours. This shows that filter medium cleaning is required every 4.5 hours.

On the other hand, in the filter device 1A (the lines denoted by E1-1 and E1-2 in FIG. 14) having the filter medium layer 3 formed by mixing the filter media 4 and the filtering aids 5 according to this embodiment, the time to filtration pressure rise became dramatically longer.

To be more specific, in the filter medium layer 3Aa (the line denoted by E1-1 in FIG. 14) having the filter media 4 and the filtering aids 5 evenly mixed therein in a volume ratio of 90% to 10%, the filtration pressure rose only to 6 to 7 kPa in 4.5 hours, and it took 7 hours for the filtration pressure to rise to 15 kPa. There was no difference in SS concentration in the treated liquid after the 7-hour filtration process between the relevant filter device and the filter device 1A of this embodiment.

Meanwhile, in the filter medium layer 3Ab (the line denoted by E1-2 in FIG. 14) having the filter media 4 and the filtering aids 5 evenly mixed therein in a volume ratio of 80% to 20%, it took 8.5 hours for the filtration pressure to rise to 15 kPa. However, there was a rapid rise after 4 hours in SS concentration in the treated liquid after the filtration process, and a breakthrough phenomenon was observed.

The filter medium layer in the relevant filter device is formed of only the filter media 4. Therefore, the gaps between the filter media 4 and 4 are small, and the voids inside the filter media 4 are also small. For this reason, the filter media 4 deposited near the surface of the filter medium layer capture many suspended solids in a short period of time. However, the capture of the suspended solids reduces the flow area of the filter media 4, and increases the filtration pressure over a short time in the filter device.

On the other hand, the filter medium layer 3A in the filter device 1A of this embodiment is formed by mixing the filter media 4 and the filtering aids 5. Thus, the liquid to be treated is passed into the filter medium layer 3A through the filtering aids 5.

Particularly, in the filter medium layer 3Aa having the filtering aids 5 mixed therein by 10% in volume ratio, an adequate passage to pass the liquid into the filter medium layer 3Aa through the filtering aids 5 is secured even when the suspended solids are captured by the filter media 4 near the surface of the filter medium layer 3Aa. Also, the filter media 4 on the downstream side of the filtering aids 5 capture the suspended solids in the liquid to be treated passed through the filtering aids 5. As a result, the effective utilization of the entire filter medium layer 3Aa increases the filtration area and makes the filtration pressure rise gradually.

When the ratio of the filtering aids 5 is increased, more suspended solids may be captured on the downstream side of the filter medium layer 3A, making the breakthrough phenomenon likely to occur. Also, flow passages may be formed by the filtering aids 5 connected from the upstream side to downstream side of the filter medium layer 3A. In such a case, the SS concentration in the treated liquid may be increased.

The mixing ratio in volume (hereinafter referred to as the volume mixing ratio) of the filter media 4 to the filtering aids 5 may be selected according to the properties of the liquid to be treated, the amount thereof and the filter device. Considering the filtration pressure rise time and the breakthrough phenomenon, the volume mixing ratio of the filter media 4 and the filtering aids 5 can be set to 0.95 to 0.5:0.05 to 0.5.

According to this embodiment, clarifying filtration can be performed while carrying out depth filtration effectively using the entire filter medium layer with a long filtration duration time without selecting the filter media according to the liquid to be treated, and thereby making the breakthrough phenomenon less likely to occur.

The filter medium layers 3A and 3B included in the filter devices 1A and 1B according to this embodiment are formed by mixing the filter media 4 to capture the suspended solids contained in the liquid to be treated and the filtering aids 5 to pass the liquid to be treated containing the suspended solids toward the downstream side of the filter medium layers 3A and 3B. In the filtration process, the liquid to be treated is easily passed into the inside of the filter medium layer through the filtering aids 5. Thus, not only the surfaces of the filter medium layers 3A and 3B but also the inside thereof is effectively utilized for filtration. As a result, the clarifying filtration can be performed while capturing a large amount of the suspended solids, preventing a filtration pressure rise and increasing the filtration duration time. Moreover, the filter medium layers of this embodiment are applicable to various kinds of liquids to be treated only by changing the mixing ratio of the filtering aids 5. This eliminates the need to change to filter media having different specifications, and adjustment of the SS concentration in the treated water can be easily performed.

According to this embodiment, adjustment of the volume mixing ratio of the filter media 4 and the filtering aids 5 makes it possible to optimize the functions of the filter medium layer 3 according to the properties of the liquid to be treated and treatment conditions. Thus, the entire filter medium layer can be effectively utilized also for coagulation filtration, which is likely to result in surface filtration, and high-turbidity water or for a special purpose that requires a high degree of clarification such as a pool.

Second Embodiment

A filter device 101 according to a second embodiment performs separation cleaning of suspended solids contained in a liquid to be treated such as living drainage (wastewater) and industrial drainage (wastewater), for example, with a filter medium layer 103 using floating filter media 104 and filtering aids 105.

Figure 15:
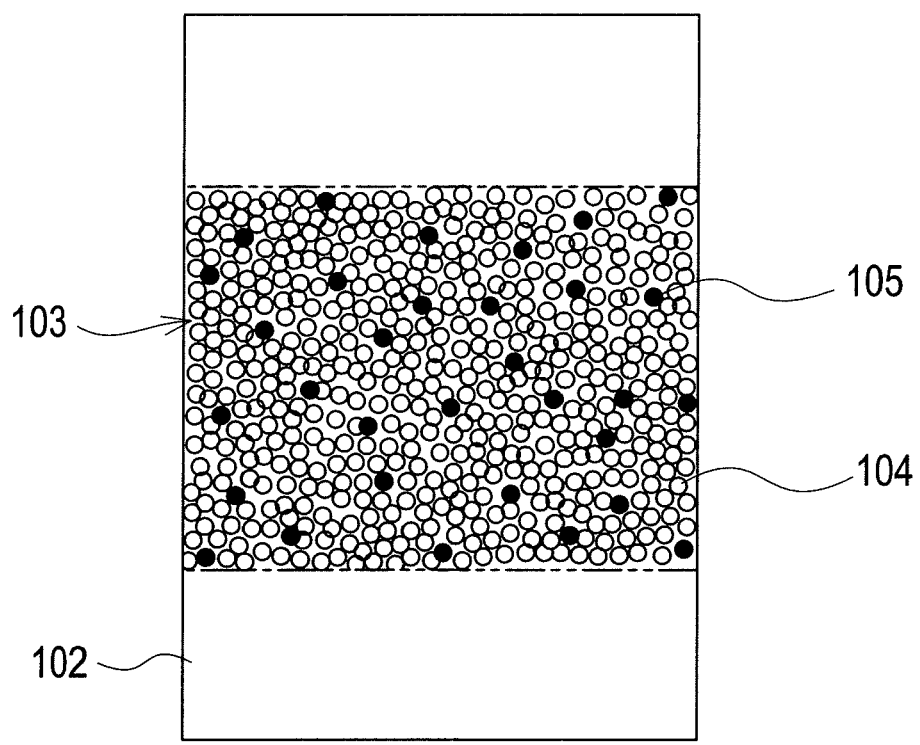
FIG. 15 is a schematic configuration diagram of a filter medium layer in a filter device according to a second embodiment.

FIG. 15 is a schematic configuration diagram of the filter medium layer 103. A filter tank 102 is filled with the filter media 104 and the filtering aids 105 to form the filter medium layer 103 in a state where the filter media and the filtering aids are mixed. In floating filtration, assuming that the specific gravity of the liquid to be treated as a filtration target is 1.0, the apparent specific gravity of the filter medium 104 and the filtering aid 105 is each less than 1.0. Since the specific gravity of the filter medium 104 and the filtering aid 105 is each less than 1.0, the filter medium layer 103 is formed in an upper part of the filter tank 102, resulting in the filter device 101 of an upward-flow type shown in FIG. 16.

Figure 16:
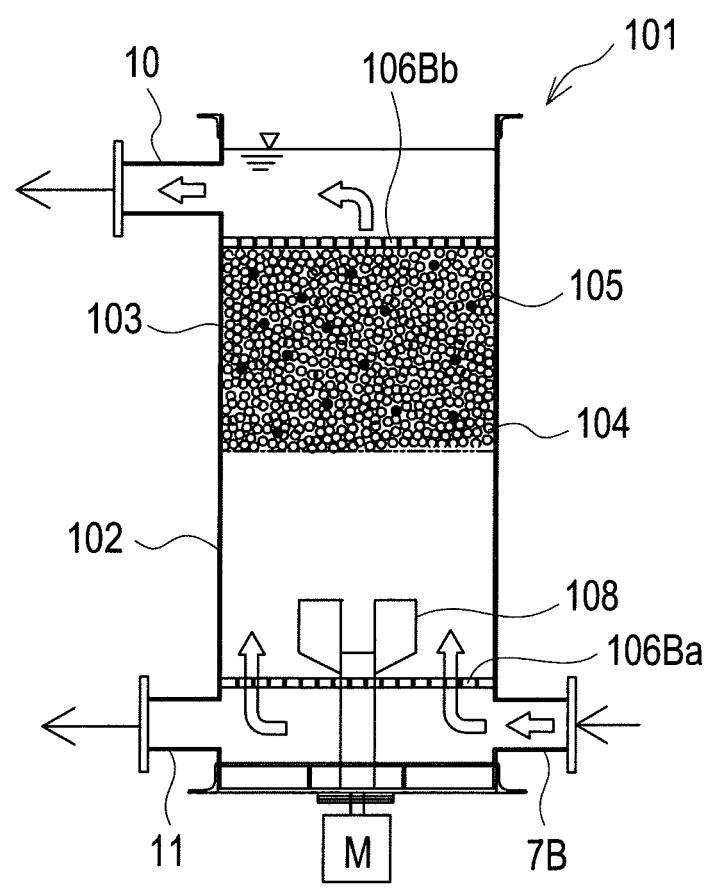
FIG. 16 shows an upward-flow type filter device.

FIG. 16 shows the upward-flow type filter device 101. Inside the filter tank 102, a filter medium leakage prevention lower-side screen 106Ba to prevent leakage of the filter media 104 is provided at a predetermined height from the lower end. Also, a filter medium leakage prevention upper-side screen 106Bb to prevent leakage of the filter media 104 is provided at a predetermined height from the upper end. Below the filter medium leakage prevention upper-side screen 106Bb, the filter medium layer 103 having a predetermined thickness is formed.

The filter medium layer 103 is formed by mixing the filter media 104 and the filtering aids 105.

The filter medium 104 and filtering aid 105 used in the filter device 101 have the specific gravity of less than 1.0.

A liquid-to-be-treated feed pipe 7B is connected to the filter tank 102 so as to feed the liquid to be treated from below the filter medium leakage prevention lower-side screen 106Ba.

A cleaner 108 stirs and cleans the filter media 104 and filtering aids 105 included in the filter medium layer 104 by rotating stirring blades. The cleaner 108 is provided so as to penetrate from outside of the bottom surface of the filter tank 102 to above the filter medium leakage prevention lower-side screen 106Ba.

A discharge pipe 11 to discharge the liquid to be treated (water to be treated) or the like is connected to a portion, of the filter tank 102, below the filter medium leakage prevention lower-side screen 106Ba.

A treated liquid discharge pipe 10 to discharge the treated liquid (treated water) is connected to a portion, of the filter tank 102, above the filter medium leakage prevention upper-side screen 106Bb.

The filter media 104 capture suspended solids in gaps between the filter media 104. The gaps between the filter media 104 vary depending on the grain size and the injection pressure of the liquid to be treated. Therefore, filtration performance can be adjusted by changing these conditions. Application to various kinds of liquids to be treated is enabled also by adjusting the mixing ratio of the filter media 104 and the filtering aids 105.

The filter medium 104 is a solid granular filter medium which floats in the liquid to be treated and is suitable to form the filter layer. As the filter medium, softened resin having floating closed pores or thermoplastic resin such as PP (polypropylene) and PE (polyethylene) can be used. As for the shape of the granular filter medium, a spherical shape, a cylindrical shape or any other shape can be used. As the filter medium 104, the filter medium 4 of the first embodiment may be used.

The filtering aid 105 according to the second embodiment has the ability to pass liquids and has voids or openings which are enough for the liquid to be treated including the suspended solids to pass from one side to the other side of the filtering aid 105. Since the filter media 104 and the filtering aids 105 are mixed in the filter medium layer 103, the suspended solids not captured in the filter medium layer 103 on the upstream side are passed toward the downstream side together with the liquid to be treated by the filtering aids 105. Then, the suspended solids passing through the upstream side are captured in the filter medium layer 103 on the downstream side.

Even after many suspended solids are captured on a surface S (see FIG. 21) of the filter medium layer 103, an adequate amount of the filtering aids 105 mixed in the filter medium layer 103 can secure a flow passage into the filter medium layer 103, making it hard for a filtration pressure to rise. The filtering aids 105 guide the liquid to be treated into the filter medium layer 103 and facilitate depth filtration inside the filter medium layer 103. As a result, a long filtration time can be set for one filtration process and thus a filtration amount is increased.

The filtering aid 105 is formed to have a structure that can maintain its shape even when compacted, such as a structure using a member having sufficient strength or a structure having an increased fiber diameter, for example. To be more specific, the filtering aid 105 may be formed of synthetic resin such as plastic or synthetic fibers such as PP and PE.

The filtering aid 105 has voids much larger than the gaps between the filter media 104 therein and has at least two or more openings communicated with the inside thereof. The internal voids and openings of the filtering aid 105 are large enough for the liquid to be treated including the suspended solids to pass therethrough. The liquid to be treated including the suspended solids flows into the internal voids from one of the openings of the filtering aid 105, passes through the internal voids and then flows out from the other opening. The shapes, sizes and the like of the internal voids and openings of the filtering aid 105 are not specified as long as the voids and openings are large enough so that the liquid can pass toward the downstream side of the filter medium layer 103 after passing through the internal voids of the filtering aid 105 from the opening. The openings communicating the inside with the outside may be provided in two or more spots at symmetrical positions.

The member constituting the filtering aid 105 is not easily deformed by compression even when compacted inside the filter medium layer 103. Therefore, the filter medium layer 103 can always secure flow passages formed by the voids inside the filtering aid even during a filtration operation.

When the size of the filtering aid 105 is set approximately the same as that of the filter medium 104, the gap between the filter media 104 and 104 becomes approximately the same as the gap between the filter medium 104 and the filtering aid 105. As a result, imbalanced filtration becomes less likely to occur in the filter medium layer 103.

The filtering aid 105 may have the fibers stand upright, partly, for example, on a surface of the filtering aid 105 so that the suspended solids can be captured on the surface of the filtering aid 105.

FIGS. 17 to 20 are schematic diagrams of filtering aids 105 according to the second embodiment.

Figure 17:
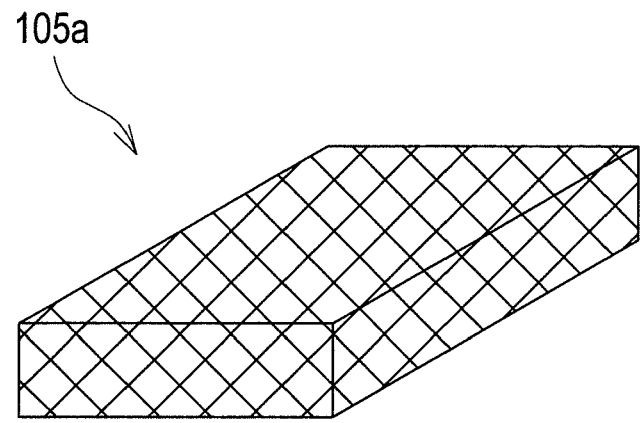
FIG. 17 is a schematic diagram of a rectangular filtering aid.

FIG. 17 shows a rectangular filtering aid 105a having the ability to pass liquids. Although the rectangular filtering aid 105a is formed in a rectangular shape and is formed by bonding wave-shaped filament fibers to each other so as to have a large amount of voids therein. The fibers are coarser than those of the filter medium 104. Thus, the rectangular filtering aid 105a has voids therein, which are enough for the liquid to be treated including the suspended solids to pass.

Figure 18:
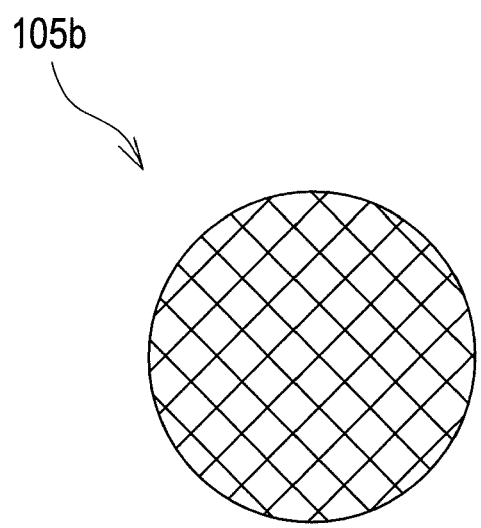
FIG. 18 is a schematic diagram of a spherical filtering aid.

FIG. 18 shows a spherical filtering aid 105b having the ability to pass liquids according to a modified example of this embodiment. The spherical filtering aid 105b is formed in a spherical shape. As in the case of the rectangular filtering aid 105a, the spherical filtering aid 105b has fibers coarser than those of the filter medium 104. Thus, the spherical filtering aid 105b has voids therein, which are enough for the liquid to be treated including the suspended solids to pass.

Figure 19:
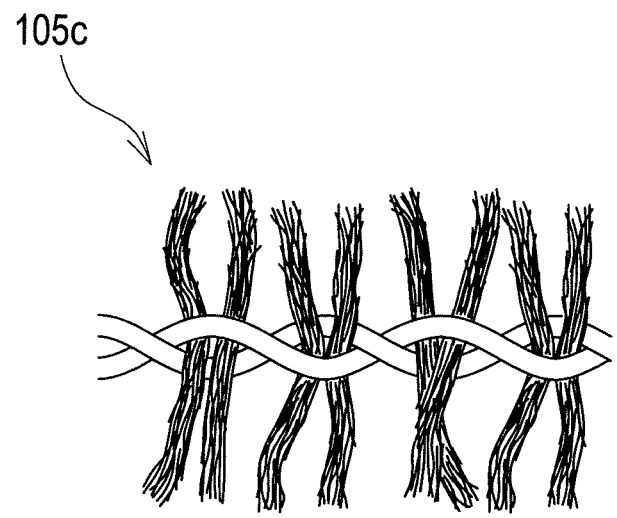
FIG. 19 is a schematic diagram of a twisted filtering aid.

FIG. 19 shows a twisted filtering aid 105c having the ability to pass liquids according to a modified example of this embodiment. The twisted filtering aid 105c is formed in a twisted shape. As in the case of the rectangular filtering aid 105a, the twisted filtering aid 105c has fibers coarser than those of the filter medium 104. Thus, the twisted filtering aid 105c has voids therein, which are enough for the liquid to be treated including the suspended solids to pass.

Figure 20:
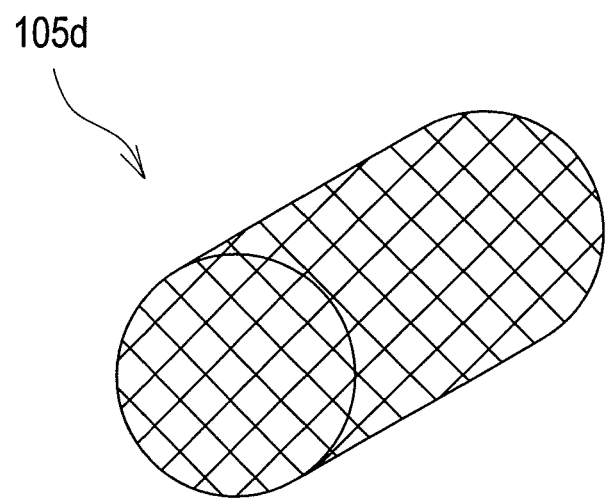
FIG. 20 is a schematic diagram of a cylindrical filtering aid.

FIG. 20 shows a cylindrical filtering aid 105d having the ability to pass liquids according to a modified example of this embodiment. The cylindrical filtering aid 105d is formed in a cylindrical shape. As in the case of the rectangular filtering aid 105a, the cylindrical filtering aid 105d has fibers coarser than those of the filter medium 104. Thus, the cylindrical filtering aid 105d has voids therein, which are enough for the liquid to be treated including the suspended solids to pass.

These filtering aids 105 (105a to 105d) may have the strength increased by increasing the thickness of the fibers constituting the filtering aids 105, so that the shapes thereof are not deformed by the pressure of the liquid to be treated when the liquid is passed therethrough. The filtering aids can also be provided with a filtration function by thickening the fibers.

The rectangular filtering aid 105a, spherical filtering aid 105b and cylindrical filtering aid 105d shown in FIGS. 17 to 20 may be formed of fibers which are hollow or have enough voids inside. Also, when the inside is hollow, openings may be provided on a peripheral wall, through which suspended solids can always easily pass inside the filtering aid. Moreover, the filtering aids may have a function to capture the suspended solids with the fibers standing upright on the peripheral wall.

Figure 21:
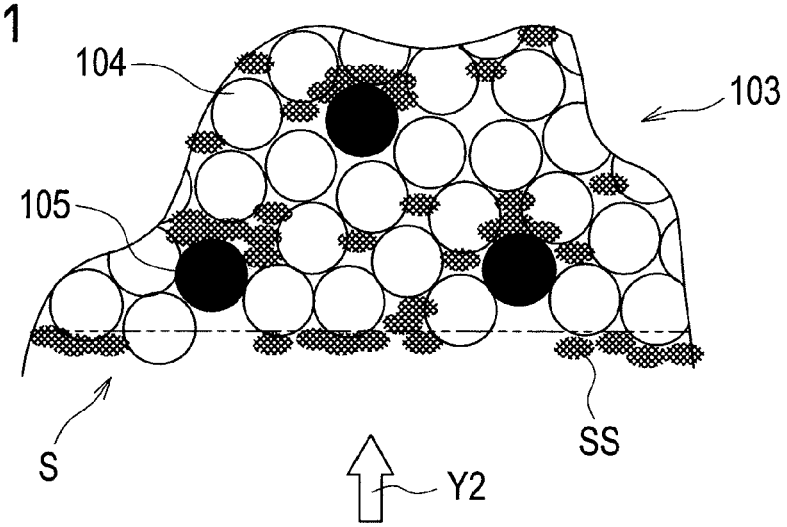
FIG. 21 is a partially enlarged view of a surface layer portion of the filter medium layer, showing a filtration state.

FIG. 21 is a partially enlarged view of an example of the filter medium layer 103. The filter media 104 and the filtering aids 105 are mixed to form the filter medium layer 103.

When the liquid to be treated is passed through the filter medium layer 103 in a direction indicated by the arrow Y2, suspended solids SS are captured in the gaps between the filter media 104 positioned near the surface S of the filter medium layer 103. The treated liquid having the suspended solids SS removed and the liquid to be treated including some suspended solids SS yet to be captured flow into the filter medium layer 103 while passing through the gaps between the filter media 104, the voids inside the filtering aids 105 and the gaps between the filter media 104 and the filtering aids 105. In this event, the suspended solids SS are captured in the gaps between the filter media 104 and the gaps between the filter media 104 and the filtering aids 105 inside the filter medium layer 103.

The filter medium layer 103 has the filtering aids 105 mixed therein, and thus the suspended solids SS included in the liquid to be treated can easily pass through the filtering aids 105. After the liquid passes through the filtering aids, the suspended solids SS are captured in the gaps between the filter media 104 if there are filter media 104 on the downstream side. Then, the liquid to be treated including the suspended solids SS still yet to be captured further flows deep down in the filter medium layer 103 while passing through the gaps between the filter media 104, the voids inside the filtering aids 105 and the gaps between the filter media 104 and the filtering aids 105. This process is repeated to capture more and more suspended solids SS.

By passing the liquid to be treated including the suspended solids SS into the filter medium layer 103 through the filtering aids 105 as described above, the suspended solids SS can be carried deep down in the filter medium layer 103 by the filtering aids 105 without lowering a capture rate between the filter media 104. Thus, efficient filtration can be performed also inside the filter medium layer 103. As a result, depth filtration can be realized with effective utilization of the entire filter medium layer 103.

As shown in FIG. 15, the filter media 104 and the filtering aids 105 are adequately dispersed when the specific gravity of the filter medium 104 and the filtering aid 105 is each 0.1 or more and less than 1.0 in the case of the upward-flow type filter device 101. When a difference in specific gravity between the filter medium 104 and the filtering aid 105 is set to be small and the filter medium 104 and filtering aid 105 having the same shape are used, the filter media and the filtering aids are evenly mixed to form the filter medium layer 103 and also evenly dispersed therein even after cleaning and stirring, as shown in FIG. 15.

Figure 22:
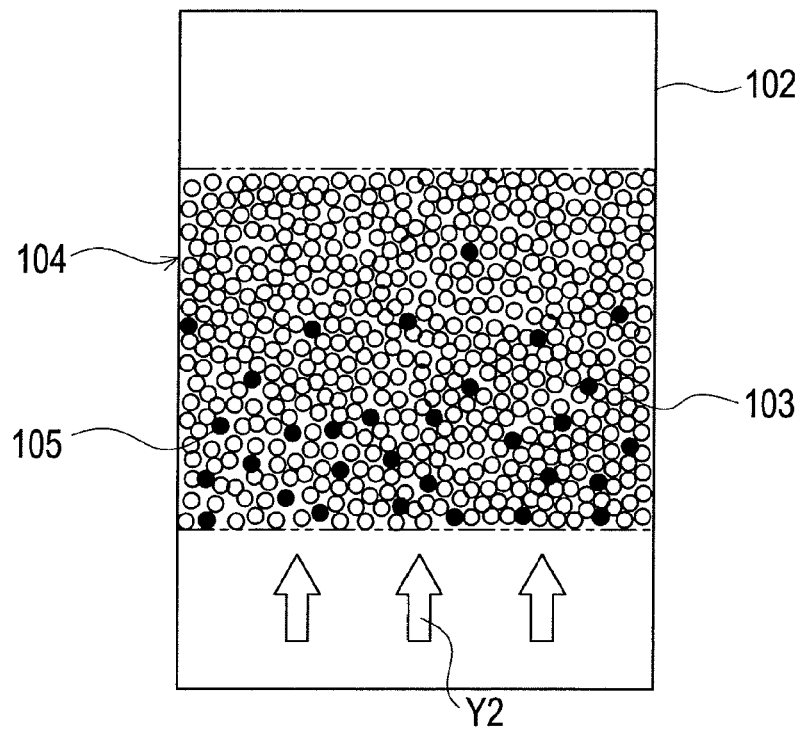
FIG. 22 is a schematic configuration diagram of a surface-dispersed filter medium layer.

As shown in FIG. 22, when the difference in specific gravity between the filter medium. 104 and the filtering aid 105 is set to be large (the specific gravity of the filtering aid 105 is set to be larger than that of the filter medium 104) or the filter medium 104 and filtering aid 105 having different shapes are used, more filtering aids 105 can be mixed on the upstream side of the filter medium layer 103, resulting in surface dispersion, because of the difference in specific gravity and shape after stirring and cleaning. When more filtering aids 105 are mixed on the side closer to the surface layer of the filter medium layer 103, an increase in filtration pressure can be prevented near the surface layer (the surface S of the filter medium layer 103) where clogging of the filter media 104 is likely to occur. Accordingly, the suspended solids can be captured by allowing the liquid to be treated to actively flow into the filter medium layer 103.

Adjustment of the mixture ratio of the filter media 104 and the filtering aids 105 enables application to various liquids to be treated, resulting in no need to prepare various kinds of filter media 104 having different sizes. The gaps between the filter media 104 can be set by adjusting the compaction degree of the filter medium layer 103 according to conditions.

Next, description will be given of an example of filtration process performed by the filter device 101 using the filter medium layer 102.

After fed into the filter tank 102 from the liquid-to-be-treated feed pipe 7B, the liquid to be treated is filtered while flowing upward inside the filter medium layer 103 formed of the filter media 104 and the filtering aids 105, and is discharged through the treated liquid discharge pipe 10. In the filter medium layer 103, depth filtration is performed by carrying the suspended solids deep down therein by the filtering aids 105 while capturing the suspended solids in the surface layer.

When the filtration pressure is increased by clogging due to the suspended solids captured in the filter medium layer 103 or when an accumulated operating time of the filter device has reached a predetermined time or when the treated liquid no longer reaches its predetermined standards, for example, the stirring blades of the cleaner 108 are rotated to clean the filter medium layer 103.

The stirring of the filter media 104 and the filtering aids 105 by swirling flows generated by the rotation of the stirring blades inside the filter tank 102 causes the suspended solids captured in the filter medium layer 103 to come off and settle out to be discharged to the outside of the filter tank 102 through the discharge pipe 11. In cleaning of the filter medium layer 103, cleaning water which meets predetermined standards, e.g., the treated liquid (treated water) may be supplied as a cleaning liquid (cleaning water) to be supplied into the filter tank 102.

A comparative test was conducted using a relevant upward-flow type filter device having a filter medium layer formed of only the filter media 104 and the upward-flow type filter device 101 having the filter medium layer 103 formed by mixing the filter media 104 and the filtering aids 105 according to the second embodiment. Specifications of a liquid to be treated, flow speed, filter media, filtering aids, relevant filter device and filter device 101 used in the test are as follows.

Figure 23:
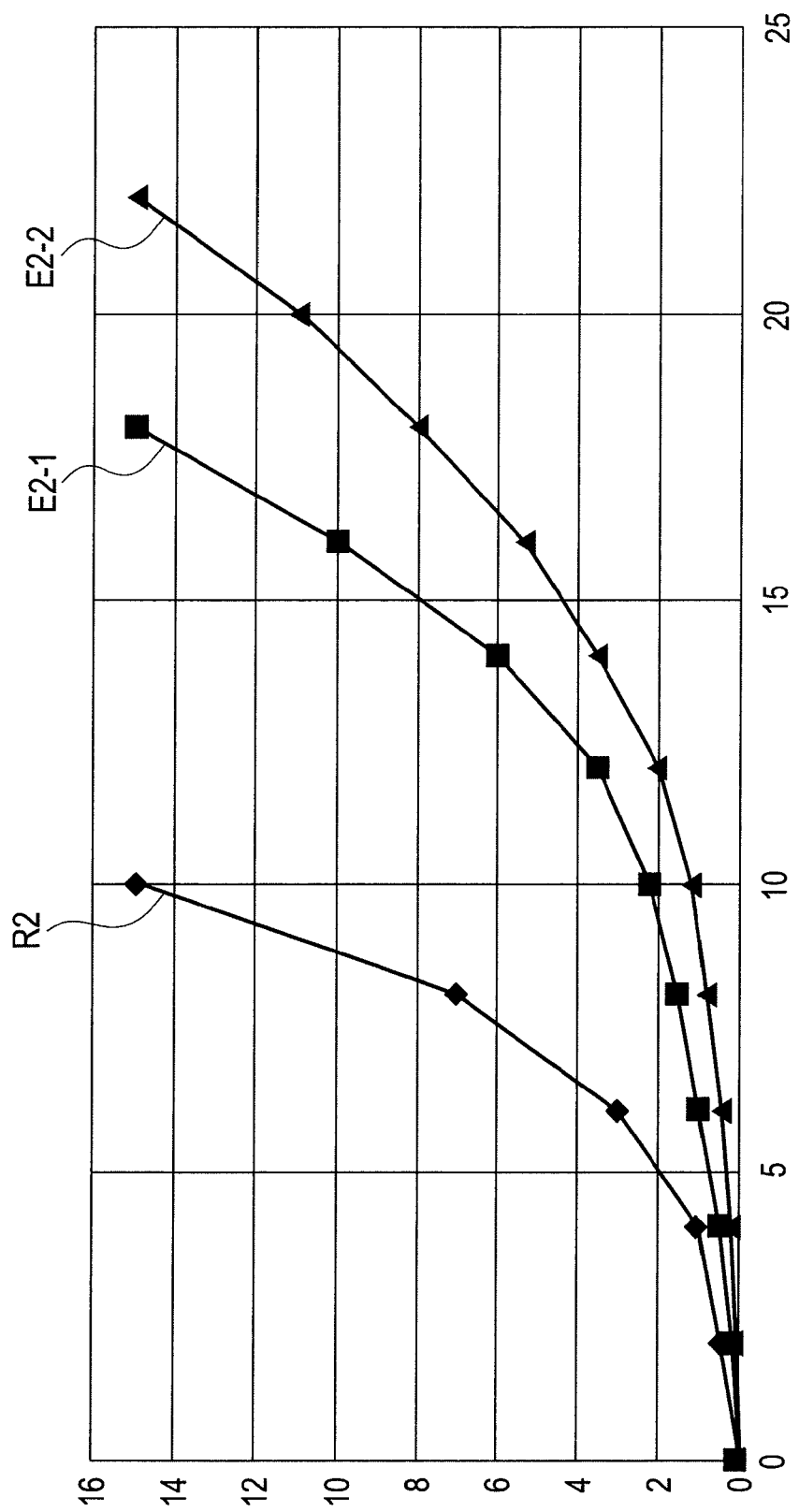
FIG. 23 is a comparison chart of a filtration pressure and a filtration duration time between the second embodiment and the related art.

Liquid to be treated: flocculated effluent
Filter medium: filter medium 104
PP pellet of 3 mm in diameter
Filtering aid: twisted filtering aid 105c
twisted fiber of 3 mm in diameter and 3 mm in length
Main body tank height: 4000 mm
Main body tank inside diameter: 600 mm in diameter
Flow speed: 40 m/h FIG. 23 is a graph showing the result of comparison of the filtration pressure and filtration duration time between the filter device 101 of the second embodiment and the relevant filter device. In FIG. 23, the vertical axis represents the filtration pressure (kPa) and the horizontal axis represents the filtration duration time (h). Normally, when the filtration pressure rises to 15 kPa, filter medium cleaning is required to remove suspended solids from the filter media 104.

In the relevant filter device (the line denoted by R2 in FIG. 23) having the filter medium layer formed of only the filter media 104, the filtration pressure rose to 15 kPa within 10 hours. This shows that filter medium cleaning is required every 10 hours.

On the other hand, in the filter device 101 (the lines denoted by E2-1 and E2-2 in FIG. 23) having the filter medium layer 103 formed by mixing the filter media 104 and the filtering aids 105 according to this embodiment, the time to filtration pressure rise became dramatically longer.

To be more specific, in the filter medium layer 103a having the filter media 104 and the filtering aids 105 evenly mixed therein in a volume ratio of 90% to 10%, the filtration pressure rose only to 2 kPa in 10 hours, and it took 18 hours for the filtration pressure to rise to 15 kPa. There was no difference in SS concentration in the treated liquid after the 18-hour filtration process between the relevant filter device and the filter device 101 of this embodiment.

Meanwhile, in the filter medium layer 103b (the line denoted by E2-2 in FIG. 23) having the filter media 104 and the filtering aids 105 evenly mixed therein in a volume ratio of 80% to 20%, it took 22 hours for the filtration pressure to rise to 15 kPa. However, there was a rapid rise after 12 hours in SS concentration in the treated liquid after the filtration process, and a breakthrough phenomenon was observed.

The filter medium layer in the relevant filter device is formed of only the filter media 104. Therefore, the gaps between the filter media 104 and 104 are small, and the filter media 104 deposited near the surface of the filter medium layer capture many suspended solids in a short period of time. However, the capture of the suspended solids reduces the flow area of the filter media 104, and increases the filtration pressure over a short time in the filter device.

On the other hand, the filter medium layer 103 in the filter device 101 of this embodiment is formed by mixing the filter media 104 and the filtering aids 105. Thus, the liquid to be treated is passed into the filter medium layer 103 through the filtering aids 105.

Particularly, in the filter medium layer 103a having the filtering aids 105 mixed therein by 10% in volume ratio, an adequate passage to pass the liquid into the filter medium layer 103a through the filtering aids 105 is secured even when the suspended solids are captured by the filter media 104 near the surface S of the filter medium layer 103a. Also, the filter media 104 on the downstream side of the filtering aids 105 capture the suspended solids in the liquid to be treated passed through the filtering aids 105. As a result, the effective utilization of the entire filter medium layer 103a increases the filtration area and makes the filtration pressure rise gradually.

When the ratio of the filtering aids 105 is increased, more suspended solids can be captured on the downstream side of the filter medium layer 103. However, the breakthrough phenomenon becomes likely to occur. Also, flow passages may be formed by the filtering aids 105 connected from the upstream side to downstream side of the filter medium layer 103. In such a case, the SS concentration in the treated liquid may be increased.

The volume mixing ratio of the filter media 104 to the filtering aids 105 may be selected according to the properties of the liquid to be treated, the amount thereof and the filter device 101. Considering the filtration pressure rise time and the breakthrough phenomenon, the volume mixing ratio of the filter media 104 and the filtering aids 105 can be set to 0.95 to 0.5:0.05 to 0.5.

The filter medium layer 103 included in the filter device 101 according to this embodiment is formed by mixing the floating granular filter media (hereinafter referred to as the filter media) 104 to capture the suspended solids contained in the liquid to be treated and the filtering aids 105 to pass the liquid to be treated containing the suspended solids toward the downstream side of the filter medium layer 103. In the filtration process, the liquid to be treated is easily passed into the inside of the filter medium layer 103 through the filtering aids 105. Thus, not only the surface of the filter medium layer 103 but also the inside thereof is effectively utilized for filtration, resulting in depth filtration. As a result, a large amount of the suspended solids can be captured, a filtration pressure rise can be prevented, and the filtration duration time can be increased. The narrow gaps between the filter media 104 enable clarifying filtration. Moreover, the filter medium layer of this embodiment is applicable to various kinds of liquids to be treated only by changing the mixing ratio of the filtering aids 105. This eliminates the need to change the filter medium itself, and adjustment of the SS concentration in the treated water can be easily performed.

According to this embodiment, adjustment of the mixing ratio of the filter media 104 and the filtering aids 105 makes it possible to optimize the functions of the filter medium layer 103 according to the properties of the liquid to be treated and treatment conditions. Thus, the entire filter medium layer 103 can be effectively utilized also for a special purpose such as coagulation filtration, which is likely to result in surface filtration, and high-turbidity water.

Third Embodiment

A filter device 201 according to a third embodiment performs treatment of sewage generated in a sewage treatment plant or industrial wastewater or purification of lakes, rivers and the like, for example, with a filter medium layer 203 using sinking filter media 204 and filtering aids 205. The filter device 201 captures not only suspended solids in a liquid to be treated (raw water) on a surface layer of the filter medium layer 203 but also impurities inside the filter medium layer 203. In the filter device 201, the filter medium layer 203 is formed of the filter media 204 having a function to capture the suspended solids and the filtering aids 205 having a function to pass the liquid. The filter media having different functions are dispersed in the filter medium layer 203, and some of the suspended solids are carried deep down in the filter medium layer 203. Accordingly, the suspended solids are captured in the entire filter medium layer 203. By adjusting a volume mixing ratio of the filter media having different functions according to the properties of the liquid to be treated or treatment conditions, the functions of the filter medium layer 203 can be optimized.

Figure 24:
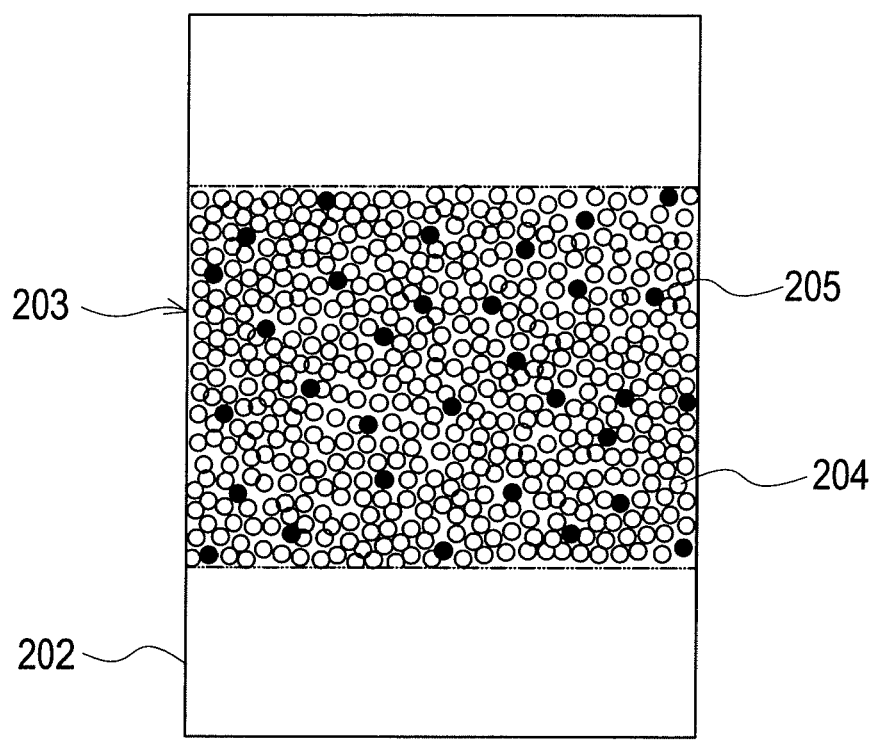
FIG. 24 is a schematic configuration diagram of a filter medium layer in a filter device according to a third embodiment.

FIG. 24 is a conceptual diagram of the filter medium layer 203 formed in a filter tank 202. The (deep) filter medium layer 203 formed in the filter tank 202 is formed on a filter medium leakage prevention screen 6A as a supporting bed having flow pores so as to have a large thickness by mixing granular filter media 204 to capture suspended solids contained in a liquid to be treated and filtering aids 205 to pass the suspended solids while adjusting a volume mixing ratio of the filter media 204 to the filtering aids 205. The granular filter media 204 have a filtration function to capture the suspended solids in gaps therebetween. The filtering aids 205 have a liquid flow function to allow the liquid to be treated including the suspended solids to pass through inside thereof. The granular filter medium 204 and the filtering aid 205 have the specific gravity of 1.0 to 3.0, respectively. The filter device 201 is a downward flow type, in which the filter medium layer 203 captures the suspended solids in the liquid to be treated fed from above the filter tank 202 and treated water subjected to solid-liquid separation is extracted from the bottom of the filter tank 202. The filter device 201 shown in FIG. 25 is configured, in which the granular filter media 204 gradually move a capture zone of the suspended solids from a surface layer along a flow direction of the liquid to be treated, the filtering aids 205 pass some of the suspended solids directly deep down in the filter medium layer 203, the suspended solids are captured between the granular filter media 204 on the downstream side, and thus solid-liquid separation can be performed utilizing the function of the entire filter medium layer 203.

Figure 25:
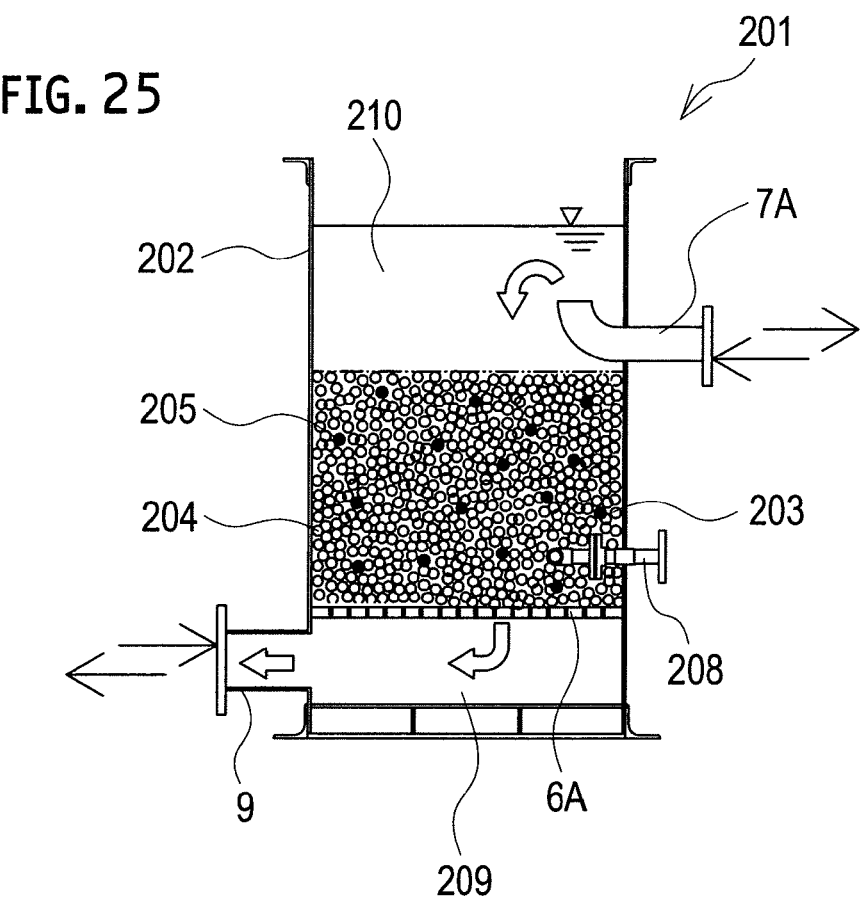
FIG. 25 is a vertical cross-sectional view of the filter device.

FIG. 25 is a vertical cross-sectional view of the downward-flow type filter device 201. A liquid-to-be-treated feed pipe 7A is connected to an upper part of the filter tank 202 in which the filter medium layer 203 is formed. A treated water pipe 9 is connected to a bottom part of the filter tank 202. A treated water chamber 209 for treated water having suspended solids removed is formed below a filter medium leakage prevention screen 6A as a supporting bed, and a liquid-to-be-treated chamber 210 is formed above the filter medium layer 203. As the granular filter media 204 which capture the suspended solids, any one of solid indefinite-form filter sand, garnet, anthracite, and thermoplastic resin such as PET (polyethylene terephthalate) or a combination thereof can be used. As the granular filter media 204, the filter media 4 of the first embodiment may be used. As the filtering aids 205 which pass the suspended solids therethrough, cylindrical, spherical or twisted filtering aids can be used. The filter medium layer 203 is formed by evenly dispersing the granular filter media 204 having the filtration function and the filtering aids 205 having the liquid passing function. Thus, the entire filter medium layer 203 can be used as a capture zone. Also, when the filtering aids 205 are dispersed and mixed more densely on the surface layer side of the filter medium layer 203, the filtering aids 205 pass many suspended solids into the filter medium layer 203. Thus, the function of the entire filter medium layer 203 can be exerted by passing the suspended solids deep down in the filter medium layer while capturing the suspended solids between the granular filter media 204.

Not only for the liquid to be treated having standard properties such as a sewage effluent but also for a special purpose such as flocculated sludge which is likely to be subjected to surface filtration, a high-turbidity liquid to be treated or a pool that requires a high degree of clarification, sufficient filtration function can be exerted when the filter medium layer 203 is formed by adjusting the volume mixing ratio of the granular filter media 204 and the filtering aids 205 according to the properties of the liquid to be treated or treatment conditions. Moreover, in clogging of the filter medium layer 203, cleaning water is supplied into the treated water chamber 209 from the treated water pipe 9, and then the cleaning water is injected through flow pores in the filter medium leakage prevention screen 6A to cause the filter medium layer 203 to flow. Thus, the suspended solids captured by the granular filter media 204 are separated to float in the liquid-to-be-treated chamber 210, and then the drain after cleaning is discharged from the liquid-to-be-treated feed pipe 7A. An ultrasonic transmitter 208 may be used for the filter medium cleaning in the filter medium layer 203.

The granular filter media 204 which capture the suspended solids are set to have a specific gravity of 1.0 to 3.0. The specific gravity of the filtering aids 205 which pass the suspended solids deep down in the filter medium layer 203 is also approximated to that of the granular filter media 204, i.e., 1.0 to 3.0.

FIGS. 26 to 29 are schematic diagrams of the filtering aids 205 according to the third embodiment.

Figure 26:
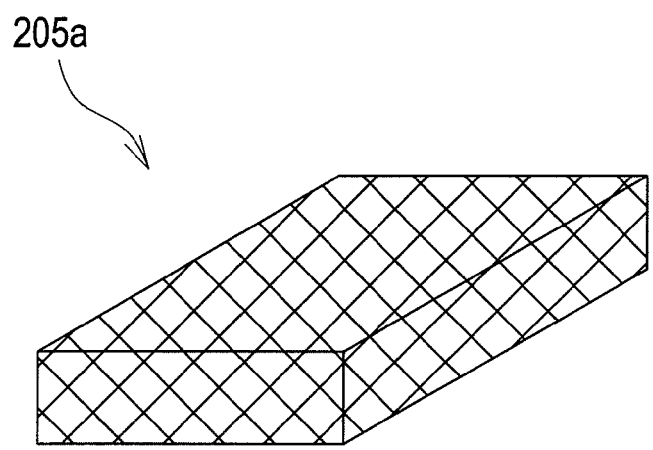
FIG. 26 is an external view of a rectangular filtering aid.

FIG. 26 shows a rectangular filtering aid 205a having a liquid passing function. In this embodiment, the rectangular filtering aid 205a is made of resin, mainly PET (polyethylene terephthalate) having the specific gravity adjusted to 1.0 to 3.0, for example, so as to have a rectangular shape of 15 mm in length, 10 mm in width and 5 mm in height.

Figure 27:
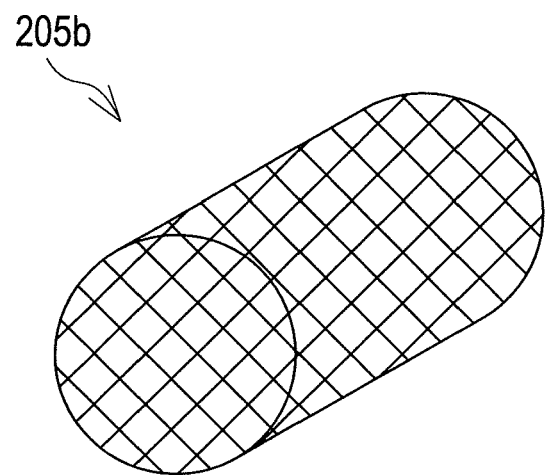
FIG. 27 is an external view of a cylindrical filtering aid.

FIG. 27 shows a cylindrical filtering aid 205b according to a modified example of this embodiment. In this embodiment, the cylindrical filtering aid 205b is made of resin fibers, mainly PET (polyethylene terephthalate) having the specific gravity adjusted to 1.0 to 3.0, for example, so as to have a cylindrical shape of 5 mm in diameter and 15 mm in length.

As to the filter medium layer 203 formed in the filter device 201 shown in FIG. 25, the cylindrical filtering aid 205b is used as the filtering aids 205, and the volume mixing ratio of the granular filter media 204 and the cylindrical filtering aids 205b is set to 0.95 to 0.5:0.05 to 0.5. Thus, the amount of SS to be captured in the entire filter medium layer 203 can be maintained while preventing the breakthrough phenomenon.

Figure 28:
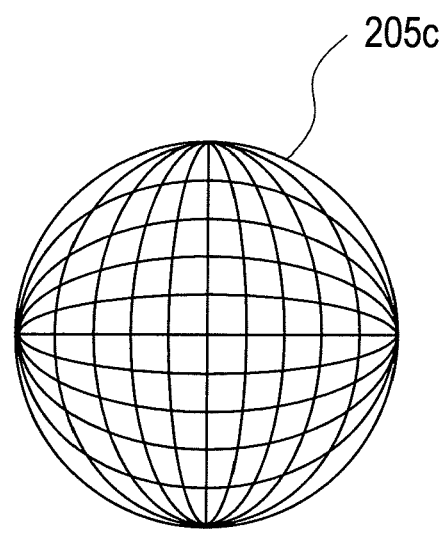
FIG. 28 is an external view of a spherical filtering aid.

FIG. 28 shows a spherical filtering aid 205c having a liquid passing function according to a modified example of this embodiment. In this embodiment, the spherical filtering aid 205c is made of PET having the specific gravity adjusted to 1.0 to 3.0 so as to have a spherical shape of 5 mm in diameter. The spherical filtering aid 205c has a function to pass the suspended solids deep down in the filter medium layer 203.

As to the filter medium 203 formed in the filter device 201 shown in FIG. 25, the spherical filtering aid 205c is used as the filtering aids 205, and the volume mixing ratio of the granular filter media 204 and the spherical filtering aids 205c is set to 0.95 to 0.5:0.05 to 0.5. Thus, the entire filter medium layer 203 can be utilized while preventing the breakthrough phenomenon.

Figure 29:
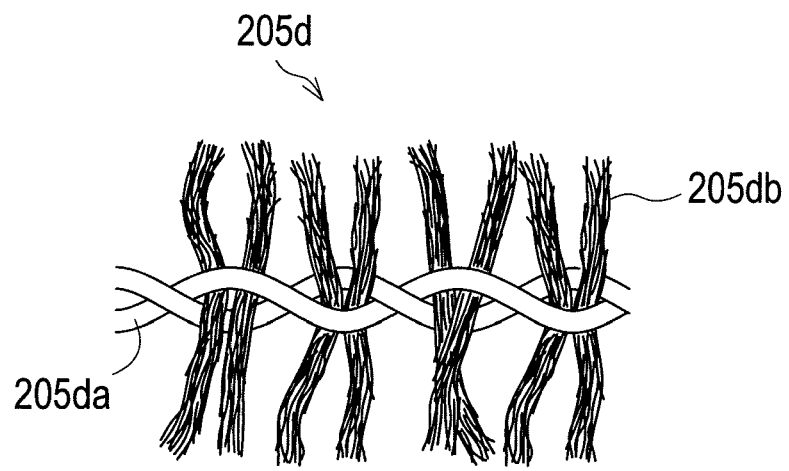
FIG. 29 is an external view of a twisted filtering aid.

FIG. 29 shows a twisted filtering aid 205d having a liquid passing function according to a modified example of this embodiment. In this embodiment, the twisted filtering aid 205d is formed by bonding PET filaments 205db to a stainless core having a specific gravity of 7.7 or an aluminum core 205da having a specific gravity of 2.7, for example, so as to have a twisted shape of 5 mm in outside diameter and 5 mm in length and have the specific gravity adjusted to 1.0 to 3.0. As shown in FIG. 29, a core formed of two strands that have been twisted together and a plurality of bundles of filaments or fibers that are bonded between the twisted strands, wherein the bundles of fibers are separated from one another by points at which the twisted strands contact one another. The twisted filtering aid 205d may be made of glass fibers. As to the twisted filtering aid 205d, gaps for the suspended solids are increase in size when coarse fibers are used by reducing the number of filaments 205db. Meanwhile, a filtration function can be provided by increasing the number of the filaments 205db of the twisted filtering aid 205d. As to the filter medium layer 203 formed in the filter device 201 shown in FIG. 25, the twisted filtering aid 205d is used as the filtering aids 205, and the volume mixing ratio of the granular filter media 204 and the twisted filtering aids 205d is set to 0.95 to 0.5:0.05 to 0.5. Thus, the function of the entire filter medium layer 203 can be exerted by allowing the suspended solids to flow deep down in the filter medium layer.

The rectangular filtering aid 205a, cylindrical filtering aid 205b and spherical filtering aid 205c shown in FIGS. 26 to 28 may be formed of fibers which are hollow or have enough voids inside. Also, when the inside is hollow, openings may be provided on a peripheral wall, through which suspended solids can always easily pass inside the filtering aid. Moreover, the filtering aids may have a function to capture the suspended solids with the fibers standing upright on the peripheral wall.

The rectangular filtering aid 205a, cylindrical filtering aid 205b, spherical filtering aid 205c and twisted filtering aid 205d used as the filtering aids 205 having the liquid passing function can also have microorganisms live therein for biotreatment.

Figure 30:
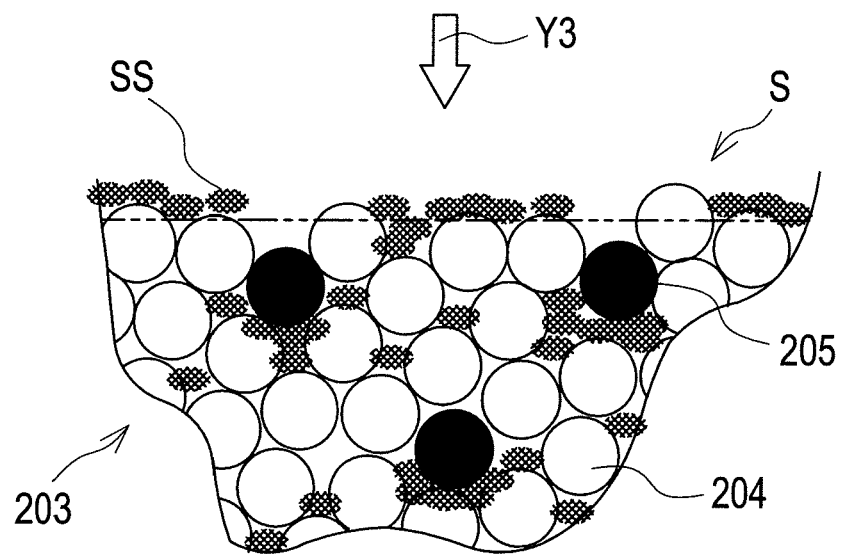
FIG. 30 is an enlarged view of a surface layer portion of the filter medium layer, showing a filtration state.

FIG. 30 is a partially enlarged view of an example of the filter medium layer 203, showing a filtration state. FIG. 30 shows a state where suspended solids SS included in a liquid to be treated are captured in a surface layer portion near the surface S of the filter medium layer 203 having the granular filter media 204 and filtering aids 205 dispersed therein. When the liquid to be treated is supplied into the liquid-to-be-treated chamber 210 in a direction indicated by the arrow Y3 from the liquid-to-be-treated feed pipe 7A of the filter tank 202 shown in FIG. 25, large suspended solids SS included in the liquid to be treated are captured between the granular filter media 204 in the surface layer portion of the filter medium layer 203. The liquid to be treated including the suspended solids SS passing through the filtering aids 205 dispersed in the surface layer portion flows into the filter medium layer 203 through the filtering aids 205 while capturing the suspended solids SS by the granular filter media 204 in the filter medium layer 203. The capture zone gradually moves along the flow direction of the liquid to be treated from the surface layer portion of the filter medium layer 203, and the remaining suspended solids SS are reduced in size as the suspended solids SS are captured by the granular filter media 204. The filtering aids 205 allow some of the suspended solids SS to directly pass deep down in the filter medium layer 203. Then, the suspended solids SS are captured by the granular filter media 204 forming the filter medium layer 203 on the downstream side. Thus, solid-liquid separation can be performed utilizing the function of the entire filter medium layer 203. The treated water having the suspended solids SS removed flows into the treated water chamber 209 through the flow pores in the filter medium leakage prevention screen 6A below the filter medium layer 203, and is then extracted through the treated water pipe 9 of the filter tank 202.

In the filter device 201 having the granular filter media 204 and filtering aids 205 dispersed therein, surface filtration by sand filtration is not performed, but the suspended solids contained in the liquid to be treated are sterically captured in the entire filter medium layer 203. Thus, the depth filtration function can be exerted, the ability to retain the suspended solids SS is improved, and a long operation can be performed while reducing the frequency of cleaning. Accordingly, the filter device 201 is realized, which optimizes the function of the filter medium layer 203 by adjusting the volume mixing ratio of the granular filter media 204 and the filtering aids 205 different in function according to the properties of the liquid to be treated and treatment conditions. The volume mixing ratio of the granular filter media 204 and the filtering aids 205 varies depending on the shape of the liquid passing member. For the cylindrical filtering aid 205a or the spherical filtering aid 205c without a filtration function, the volume mixing ratio thereof to the granular filter media 204 can be set to 10 to 30%. Meanwhile, for the twisted filtering aid 205d with a filtration function, the volume mixing ratio thereof to the granular filter media 204 can be set to about 20 to 60%.

Figure 31:
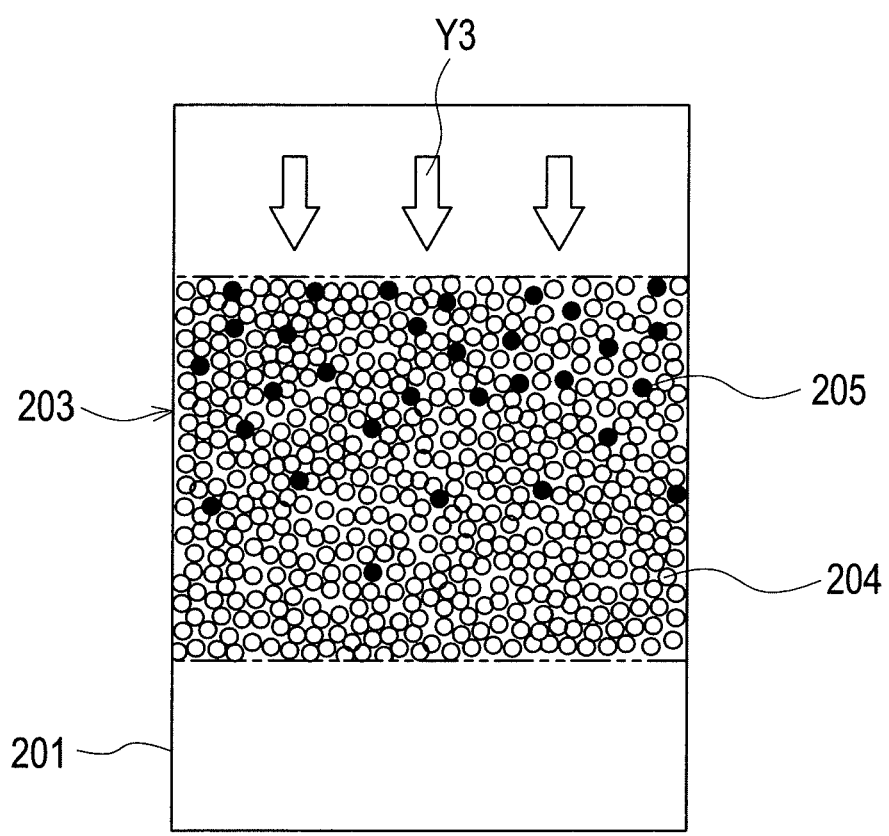
FIG. 31 is a schematic configuration diagram of a surface-dispersed filter medium layer.

FIG. 31 is a conceptual diagram of the filter tank 202 in which the filter medium layer 203 is formed by mixing filter sand as the granular filter media 204 and the twisted filtering aids 205d. To be more specific, more filtering aids 205 are mixed on the upstream side of the filter medium layer 203. Thus, an increase in filtration pressure can be prevented near the surface layer where clogging of the granular filter media 204 is likely to occur. Accordingly, the suspended solids can be captured by allowing the liquid to be treated to actively flow into the filter medium layer 203.

A comparative test was conducted using a relevant downward-flow type filter device having a filter medium layer formed of only the granular filter media 204 and the filter device 201 having the filter medium layer 203 formed by mixing the granular filter media 204 and the filtering aids 205 according to the third embodiment. Specifications of a liquid to be treated, flow speed, granular filter media, filtering aids, relevant filter device and filter device 201 used in the test are as follows.

Liquid to be treated: pond water with flocculant added therein or pond water containing algae Granular filter medium: filter sand Filtering aid: PET twisted fibers of 5 mm in diameter and 5 mm in length, which are formed using filament fibers increased in thickness and reduced in number so as to have a specific gravity of 1.38

Main body tank height: 4000 mm

Main body tank inside diameter: 600 mm in diameter

Flow speed: 20 m/h

Figure 32:
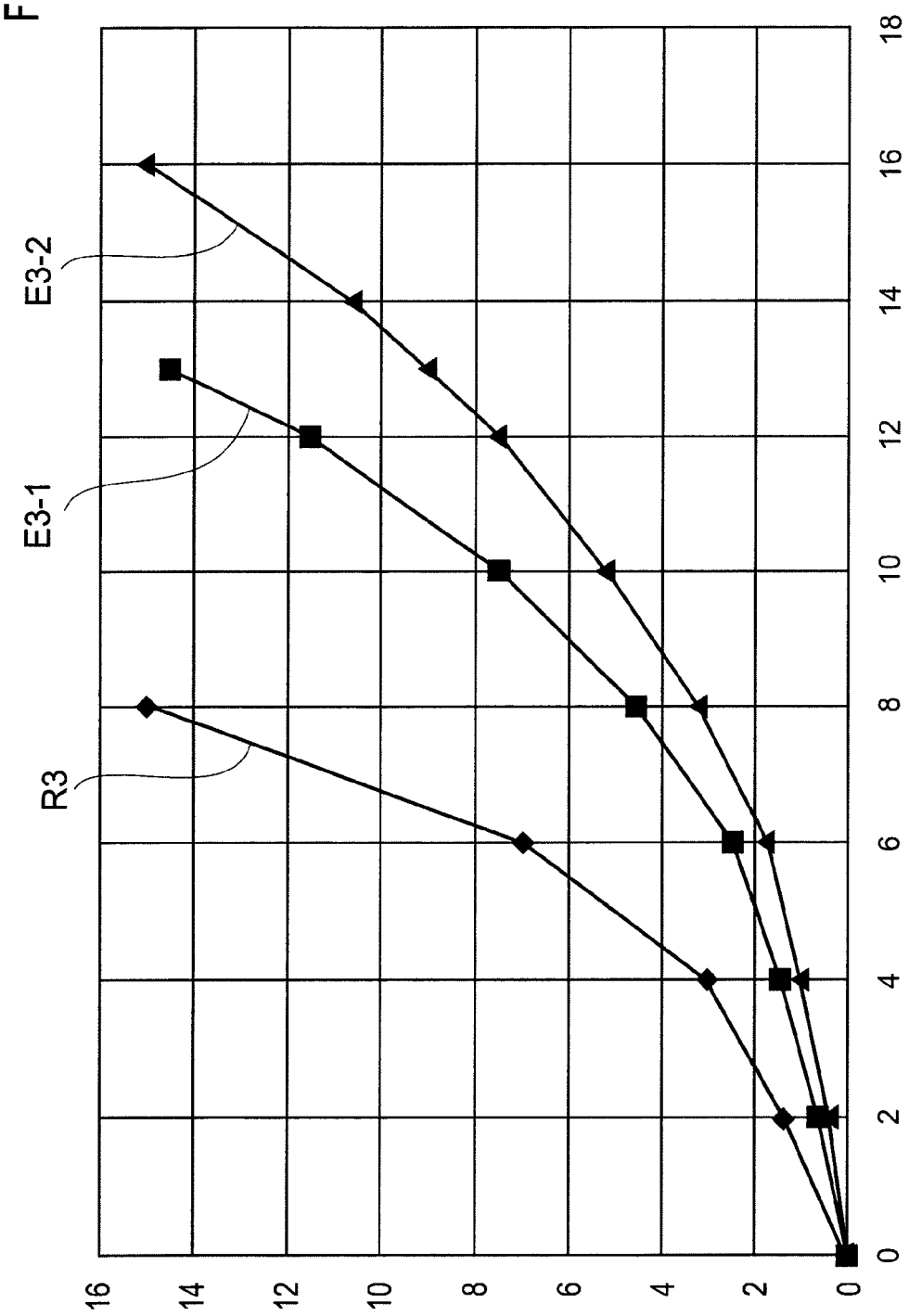
FIG. 32 is a comparison chart of a comparative test of a filtration pressure and a filtration duration time between a filter medium layer of the related art, which is formed of only filter sand, and the filter medium layer of the third embodiment, which is formed by mixing the filter sand and twisted filter media.

FIG. 32 is a graph showing the result of comparison of the filtration pressure and filtration duration time between the filter device 201 of the third embodiment and the relevant filter device. In FIG. 32, the vertical axis represents the filtration pressure (kPa) and the horizontal axis represents the filtration duration time (h).

As a result of the comparative test, when the filtration pressure rises to 15 kPa, filter medium cleaning is required to remove suspended solids causing clogging from the filter medium layer.

In the relevant filter device (the line denoted by R3 in FIG. 32), the filtration pressure rose to 15 kPa in 8 hours. This shows that filter medium cleaning is required every 8 hours.

On the other hand, in the filter device 201 (the lines denoted by E3-1 and E3-2 in FIG. 32) having the filter medium layer 203 formed by mixing the granular filter media 204 (filter sand) and the filtering aids 205d according to this embodiment, the time to filtration pressure rise became dramatically longer.

To be more specific, in the filter medium layer 203a (the line denoted by E3-1 in FIG. 32) having the granular filter media 204 and the filtering aids 205 mixed therein in a volume ratio of 80% to 20%, the filtration pressure rose only to 4.5 kPa in 8 hours, and it took 13 hours for the filtration pressure to rise to 15 kPa. There was no difference in SS concentration in the treated water passing through the filter medium layer 203a after 13 hours between the relevant filter device and the filter device 201 of this embodiment.

Meanwhile, in the filter medium layer 203b (the line denoted by E3-2 in FIG. 32) having the granular filter media 204 (filter sand) and the filtering aids 205d evenly mixed therein in a volume mixing ratio of 70% to 30%, it took 16 hours for the filtration pressure to rise to 15 kPa. However, there was a rise after 10 hours in SS concentration in the treated water after the filtration process, and a breakthrough phenomenon was observed.

The filter medium layer in the relevant filter device is formed of only the granular filter media 204. Therefore, the gaps between the granular filter media 204 and 204 (filter sand) are small. For this reason, many suspended solids are captured and deposited near the surface of the granular filter media 204 forming the filter medium layer in a short period of time. However, the capture of the suspended solids in the surface layer portion of the granular filter media 204 reduces the flow area of the filter sand, and increases the filtration pressure over a short time in the filter device.

On the other hand, the filter medium layer 203 in the filter device 201 of this embodiment is formed by mixing the granular filter media 204 (filter sand) and the twisted filtering aids 205d. Thus, the liquid to be treated is passed into the filter medium layer 203 through the gaps between the twisted filtering aids 205d.

Particularly, in the filter medium layer 203a having the twisted filtering aids 205d mixed therein by 20% in volume ratio, an adequate passage to pass the liquid into the filter medium layer 203 through the twisted filtering aids 205d is secured even when the suspended solids are captured by the granular filter media 204 (filter sand) near the surface S of the filter medium layer 203a. Also, the granular filter media 204 (filter sand) forming the filter medium layer 203 on the downstream side of the twisted filtering aids 205d capture the suspended solids in the liquid to be treated passed through the twisted filtering aids 205d. As a result, the effective utilization of the entire filter medium layer 203 increases the filtration area and makes the filtration pressure rise gradually.

When the ratio of the twisted filtering aids 205d as the filtering aids 205 is increased, more suspended solids are captured on the downstream side of the filter medium layer 203, making the breakthrough phenomenon likely to occur. Also, flow passages may be formed by the twisted filtering aids 205d connected from the upstream side to downstream side of the filter medium layer 203. In such a case, the SS concentration in the treated water may be increased.

The volume mixing ratio of the granular filter media 204 (filter sand) to the twisted filtering aids 205d can be selected according to the properties of the liquid to be treated, the amount thereof and the filter device. Considering the filtration pressure rise time and the breakthrough phenomenon, the volume mixing ratio of the granular filter media 204 (filter sand 4a) and the twisted filtering aids 205d can be set to 0.95 to 0.5:0.05 to 0.5.

The filter device 203 according to this embodiment can optimize the function of the filter medium layer 203 according to the properties of the liquid to be treated and treatment conditions by forming the filter medium layer 203 using the granular filter media 204 which capture suspended solids and the filtering aids 205 which pass the suspended solids toward the downstream side of the filter medium layer 203 and by adjusting the volume mixing ratio of the granular filter media 204 and the filtering aids 205. Thus, the filter medium layer 203 can be formed, which exerts a depth filtration function for coagulation filtration or the like, which is likely to result in surface filtration. Moreover, for a special purpose such as a high-turbidity liquid to be treated or a pool that requires a high degree of clarification, adjustment and application of the filter medium layer 203 are possible by selecting the filtering aids 205.

In the filter device 201 according to this embodiment, the filter medium layer 203 is formed in the filter tank 202 by mixing the filter media 204 which capture suspended solids and the filtering aids 205 which pass the suspended solids, and the suspended solids are captured in the entire filter medium layer 203 by passing some of the suspended solids contained in the liquid to be treated deep down in the filter medium layer 203. Accordingly, the filter device 201 is realized, which can optimize the function of the filter medium layer 203 by adjusting the volume mixing ratio of the filter media 204 and the filtering aids 205 different in function according to the properties of the liquid to be treated and treatment conditions.

Therefore, the filter device of this embodiment can be used as a downward-flow type filter device which performs treatment of sewage produced in a sewage treatment plant or industrial wastewater or purification of lakes, rivers and the like, for example.

The filter media 4, 104 and 204 and filtering aids 5, 105 and 205 described above in the first to third embodiments are not limited to the combinations of the above embodiments but any combinations are possible. For example, a filter medium layer may be formed by combining the filter media of the first embodiment and the filtering aids of the second embodiment.

While the present invention has been described above based on the embodiments, the present invention is not limited thereto. The configurations of the respective parts can be replaced by any other configurations having the same functions.

The entire contents of Japanese Patent Applications Nos. 2011-219139 (filed: Oct. 3, 2011), 2012-059681 (filed: Mar. 16, 2012) and 2012-076355 (filed: Mar. 29, 2012) are incorporated herein.

The invention claimed is:

1. A filter medium layer comprising:
   a plurality of filter media bodies that are in contact with one another and are separable from one another, the filter medium layer being configured to capture suspended solids contained in a liquid to be treated in gaps between the filter media bodies, the filter media bodies being selected from filter media bodies having voids that permit the liquid to pass through the filter media bodies while capturing the suspended solids within the filter media bodies and filter media bodies that do not allow the liquid and suspended solids to pass through the filter media bodies; and
   a plurality of filtering aids bodies that are in contact with adjacent ones of the filter media bodies and are separable from each other and from the filter media bodies, the filtering aids bodies having voids that are larger than the voids of said filter media bodies to allow the suspended solids contained in the liquid to be treated to pass through the filtering aids bodies, wherein each of the filtering aids bodies includes a core formed of two strands that have been twisted together and a plurality of bundles of fibers that are bonded between the twisted strands, wherein the bundles of fibers are separated from one another by points at which the twisted strands contact one another,
   wherein the filter media and the filtering aids bodies are mixed together, and
   wherein the liquid to be treated is filtered by being passed through the filter medium formed by the filter media bodies and the filtering aids bodies as mixed together.

2. The filter medium layer according to claim 1, wherein each of the filtering aids bodies has voids between adjacent ones of the fibers allowing the suspended solids to always easily pass through the filtering aid bodies.

3. The filter medium layer according to claim 1, wherein the fibers of each of the filtering aids bodies are formed of one of polyethylene terephthalate and glass, and wherein the strands of the core of each of the filtering aids bodies is formed of one of stainless steel and aluminum.

4. The filter medium layer according to claim 1, wherein each of the filter media bodies is formed of fibers.

5. The filter medium layer according to claim 4, wherein
   each of the filter media bodies is formed of wave-shaped filament fibers bonded to each other with a large amount of voids in the filter medium bodies,
   the fibers inside each of the filter media bodies are dense so as to capture the suspended solids between the fibers, and
   each of the fibers of the filtering aids bodies is coarser than the fibers inside each of the filter media bodies, and has strength enough not to be compacted by a filtration pressure.

6. The filter medium layer according to claim 1, wherein each of the filter media bodies is formed in a solid granular shape.

7. The filter medium layer according to claim 6, wherein each of the filter media bodies is made of thermoplastic resin.

8. The filter medium layer according to claim 6, wherein each of the filter media bodies is made of softened resin with closed pores.

9. The filter medium layer according to claim 6, wherein the filter media bodies are granules of one of filter sand, garnet, anthracite or a combination thereof.

10. The filter medium layer according to claim 1, wherein
    the filter media bodies and the filtering aids bodies are floatable in water to be treated, and
    a direction of passing the water to be treated through the filter medium layer is from a lower side to an upper side in a direction of gravitational force.

11. The filter medium layer according to claim 10, wherein each of the filter media bodies and each of the filtering aids bodies have a specific gravity of 0.1 or more and less than 1.0 when a specific gravity of the water to be treated is 1.0.

12. The filter medium layer according to claim 1, wherein
    the filter media bodies and the filtering aids bodies are sinkable in water to be treated, and
    a direction of passing the water to be treated through the filter medium layer is from an upper side to a lower side in the direction of gravitational force.

13. The filter medium layer according to claim 12, wherein each of the filter media bodies and each of the filtering aids bodies have a specific gravity of 1.0 or more and less than 3.0 when a specific gravity of the water to be treated is 1.0.

14. The filter medium layer according to claim 1, wherein the filtering aids bodies are evenly dispersed in the filter media layer amongst the filter media bodies.

15. The filter medium layer according to claim 1, wherein a larger amount of the filtering aids bodies are mixed on an upstream side than on a downstream side of the filter medium layer.

16. The filter medium layer according to claim 1, wherein a volume mixing ratio of the filter media bodies to the filtering aids bodies is 0.95 to 0.5 volume fraction of the filter media bodies to [M] 0.05 to 0.5 volume fraction of the filtering aids bodies.

17. The filter medium layer according to claim 1, further comprising a filter tank containing the filter medium layer.

18. The filter medium layer according to claim 1, wherein a volume percentage of the filter media bodies in the filter medium layer is 80% to 20%.

19. The filter medium layer according to claim 1, wherein a volume percentage of the filter media bodies in the filter medium layer is 70% to 30%.

* * * * *

UNITED STATES PATENT AND TRADEMARK OFFICE
CERTIFICATE OF CORRECTION

PATENT NO. : 9,718,004 B2
APPLICATION NO. : 14/348973
DATED : August 1, 2017
INVENTOR(S) : K. Fujita et al.

It is certified that error appears in the above-identified patent and that said Letters Patent is hereby corrected as shown below:

In the Claims

At Column 30, Line 44 (Claim 16, Line 4), please change "to [M] 0.05" to -- to 0.05 --.

Signed and Sealed this
Sixth Day of March, 2018

Andrei Iancu
*Director of the United States Patent and Trademark Office*